United States Patent
Schekall

(10) Patent No.: US 12,475,517 B2
(45) Date of Patent: Nov. 18, 2025

(54) COMPUTER PROGRAM, METHOD, AND SYSTEM FOR AUTOMATED SAVINGS AND TIME-BASED MATCHING CONTRIBUTIONS

(71) Applicant: Incentivized Savings Plan, LLC, Wichita, KS (US)

(72) Inventor: Tona Schekall, Wichita, KS (US)

(73) Assignee: Incentivized Savings Plan, LLC, Wichita, KS (US)

(*) Notice: Subject to any disclaimer, the term of this patent is extended or adjusted under 35 U.S.C. 154(b) by 407 days.

(21) Appl. No.: 17/085,322

(22) Filed: Oct. 30, 2020

(65) Prior Publication Data

US 2021/0133895 A1    May 6, 2021

Related U.S. Application Data

(60) Provisional application No. 62/928,087, filed on Oct. 30, 2019.

(51) Int. Cl.

| | |
|---|---|
| *G06Q 40/12* | (2023.01) |
| *G06F 16/22* | (2019.01) |
| *G06Q 10/1053* | (2023.01) |
| *G06Q 10/1091* | (2023.01) |
| *G06Q 20/10* | (2012.01) |

(Continued)

(52) U.S. Cl.
CPC ....... *G06Q 40/125* (2013.12); *G06F 16/2282* (2019.01); *G06Q 10/1053* (2013.01); *G06Q 10/1091* (2013.01); *G06Q 20/108* (2013.01); *G06Q 40/02* (2013.01); *G06Q 40/10* (2013.01)

(58) Field of Classification Search
CPC ............ G06Q 40/125; G06Q 10/1053; G06Q 10/1091; G06Q 20/108; G06Q 40/02; G06Q 40/10; G06Q 20/405; G06F 16/2282
See application file for complete search history.

(56) References Cited

U.S. PATENT DOCUMENTS

| | | | | |
|---|---|---|---|---|
| 6,041,313 A | * | 3/2000 | Gilbert | G06Q 40/02 |
| | | | | 705/36 R |
| 7,941,351 B1 | * | 5/2011 | Rosenfeld | G06Q 40/12 |
| | | | | 705/30 |

(Continued)

OTHER PUBLICATIONS

Code of Federal Regulations, Title 5, Administrative Personnel (Date Jan. 1, 2019) ("CFR").*

*Primary Examiner* — Peter Ludwig
(74) *Attorney, Agent, or Firm* — HOVEY WILLIAMS LLP

(57) ABSTRACT

An administrator operating a plan administrator platform is responsible for facilitating contributions made by an employer and employee to an incentivized savings plan. The administer also maintains and updates records about each of the contributions, balance(s), and transactions associated with the incentivized savings plan. The plan administrator platform issues a report to the employer each pay period, or any other defined period, informing the employer about any match amount due for the incentivized savings plan. The report may also include information about the total balance in the aggregated savings account as well as the individual balances for each employee. The plan administrator platform may also track an amount of matching contributions issued per employee, who is eligible for a withdrawal, an amount of the eligible withdrawal, and an amount of matching contributions forfeited.

6 Claims, 14 Drawing Sheets

(51) Int. Cl.
*G06Q 40/02* (2023.01)
*G06Q 40/10* (2023.01)

(56) References Cited

U.S. PATENT DOCUMENTS

| | | | | |
|---|---|---|---|---|
| 8,725,603 | B1* | 5/2014 | Harman | G06Q 40/10 705/30 |
| 2005/0065873 | A1* | 3/2005 | Hendrickson | G06Q 10/10 705/38 |
| 2014/0279700 | A1* | 9/2014 | Cook | G06Q 40/06 705/320 |
| 2014/0379611 | A1* | 12/2014 | Goldman | G06Q 10/1057 705/36 R |
| 2016/0086160 | A1* | 3/2016 | Desai | G06Q 20/3223 705/41 |
| 2016/0239807 | A1* | 8/2016 | Creighton | G06Q 10/1057 |
| 2021/0272067 | A1* | 9/2021 | Santos | G06N 3/084 |

\* cited by examiner

FIG. 5

Welcome back John

Dashboard
Transactions
Settings

Account Balance
$3,000

Make a withdraw

■ Employee Contributions
▨ Employer Contributions

▨ $1200 goal
▨ $3000 saved to-date

Saving plan settings
Your employer will match 10% of the amount you've designated below.

$100  Per week

[Submit]

Recent transactions  View all transactions

| Date | Deposit | Employer match | Company |
|---|---|---|---|
| Aug 12, 2020 | $100.00 | $10.00 | Company ABC |
| Aug 12, 2020 | $100.00 | $10.00 | Company ABC |
| Aug 12, 2020 | $100.00 | $10.00 | Company ABC |
| Aug 12, 2020 | $100.00 | $10.00 | Company ABC |
| Aug 12, 2020 | $100.00 | $10.00 | Company ABC |
| Aug 12, 2020 | $100.00 | $10.00 | Company ABC |

FIG. 6

COMPUTER PROGRAM, METHOD, AND SYSTEM FOR AUTOMATED SAVINGS AND TIME-BASED MATCHING CONTRIBUTIONS

CROSS-REFERENCE TO RELATED APPLICATIONS

This patent application claims priority to and the benefits of U.S. Provisional Patent Application Ser. No. 62/928,087 filed Oct. 30, 2019, and entitled "COMPUTER PROGRAM, METHOD, AND SYSTEM FOR AUTOMATED SAVINGS AND TIME-BASED MATCHING CONTRIBUTIONS," which is hereby incorporated by reference in its entirety.

FIELD OF THE DISCLOSURE

Embodiments of the present disclosure provide a computer program, method, and system for automated savings and matching contributions. In more detail, embodiments of the present disclosure are directed to a computer program, method, and system for providing an employer-sponsored savings plan that encourages elective employee contributions into a savings account by providing automatic, time-based matching contributions.

BACKGROUND

Americans are generally unprepared for financial emergencies due to a lack of financial savings. In 2017, six in ten Americans lacked savings to cover a $500 unplanned expense. In fact, a majority of Americans are living paycheck-to-paycheck with little to no emergency savings whatsoever. Once people receive their paychecks, they generally lack the discipline to set aside a certain amount of money for savings in order to avoid spending their entire paychecks. Some of these people may save money for long-term goals, such as retirement, but they often neglect saving for short-term goals, such as establishing an emergency fund.

Thus, there is a need for a computer program, method, and system that facilitates and incentivizes saving money for emergencies, short-term, and mid-term financial goals. Such incentives may encourage a person to not only deposit money into savings, but also to keep the deposited money in savings for an extended period of time.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computing system is provided. The computing system includes a database comprising an incentivized saving plan transaction table. The incentivized saving plan transaction table includes a plurality of employee contribution transaction records associated with employee contributions. Each of the employee contribution transaction records is further associated with a respective contribution timestamp. The computing system also includes a communication interface and a processor coupled in communication to the database and the communication interface. The processor is programmed to perform operations including receiving, from an employer computing device via the communication interface, payroll data. The payroll data includes an employee compensation amount for a corresponding payroll period. The payroll data also corresponds to a payroll date. The processor is also programmed to retrieve, from the database, incentivized savings plan preferences data and an employee account for a participating employee. The employee account includes employee account preferences. The processor is further programmed to determine an employee contribution amount based on the employee account preferences and the employee compensation amount. Furthermore, the processor is programmed to associate an additional contribution timestamp with the employee contribution amount. The additional contribution timestamp corresponds to the payroll date. Moreover, the processor is programmed to store the employee contribution amount and the associated additional contribution timestamp in the incentivized saving plan transaction table as an additional employee contribution transaction record. Based on the payroll date and each of the respective contribution timestamps, the processor determine an employer matching contribution amount and associates an employer contribution timestamp with the employer matching contribution amount. The employer contribution timestamp corresponds to the payroll date. Moreover, the processor is programmed to store the employer matching contribution amount and the associated employer contribution timestamp in the incentivized saving plan transaction table as an employer contribution transaction record.

In another aspect, a method performed by a server is provided. The server includes a database having an incentivized saving plan transaction table stored thereon. The incentivized saving plan transaction table includes a plurality of employee contribution transaction records associated with employee contributions. Each of the employee contribution transaction records is further associated with a respective contribution timestamp. The method includes receiving payroll data from an employer computing device. The payroll data includes an employee compensation amount for a corresponding payroll period. The payroll data corresponds to a payroll date. The method also includes retrieving, from the database, incentivized savings plan preferences data and an employee account for a participating employee. The employee account includes employee account preferences. Based on the employee account preferences and the employee compensation amount, the method includes determine an employee contribution amount and associating an additional contribution timestamp with the employee contribution amount. The additional contribution timestamp corresponds to the payroll date. Furthermore, the method includes storing the employee contribution amount and the associated additional contribution timestamp in the incentivized saving plan transaction table as an additional employee contribution transaction record. Based on the payroll date and each of the respective contribution timestamps, the method determines an employer matching contribution amount and associates an employer contribution timestamp with the employer matching contribution amount. The employer contribution timestamp corresponds to the payroll date. In addition, the method includes storing the employer matching contribution amount and the associated employer contribution timestamp in the incentivized saving plan transaction table as an employer contribution transaction record.

In yet another aspect, one or more non-transitory computer-readable storage media are provided. The computer-readable storage media includes computer-executable instructions embodied thereon. When executed by a processor, the computer-executable instructions cause the processor to receive payroll data from an employer computing device. The payroll data includes an employee compensation amount for a corresponding payroll period. The payroll data corresponds to a payroll date. The computer-executable instructions cause the processor to retrieve, from a database, incentivized savings plan preferences data. The database includes an incentivized saving plan transaction table stored thereon. The incentivized saving plan transaction table includes a plurality of employee contribution transaction records associated with employee contributions. Each of the employee contribution transaction records is further associated with a respective contribution timestamp. The computer-executable instructions also cause the processor to retrieve, from the database, an employee account for a participating employee. The employee account includes employee account preferences. Furthermore, the computer-executable instructions cause the processor to determine an employee contribution amount based on the employee account preferences and the employee compensation amount, and to associate an additional contribution timestamp with the employee contribution amount. The additional contribution timestamp corresponds to the payroll date. Moreover, the computer-executable instructions cause the processor to store the employee contribution amount and the associated additional contribution timestamp in the incentivized saving plan transaction table as an additional employee contribution transaction record. The computer-executable instructions cause the processor to determine an employer matching contribution amount based on the payroll date and each of the respective contribution timestamps, and to associate an employer contribution timestamp with the employer matching contribution amount, the employer contribution timestamp corresponding to the payroll date. In addition, the computer-executable instructions cause the processor to store the employer matching contribution amount and the associated employer contribution timestamp in the incentivized saving plan transaction table as an employer contribution transaction record.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 5 depicts an example employer dashboard screen;

FIG. 6 depicts an example employee dashboard screen;

Figure 1:
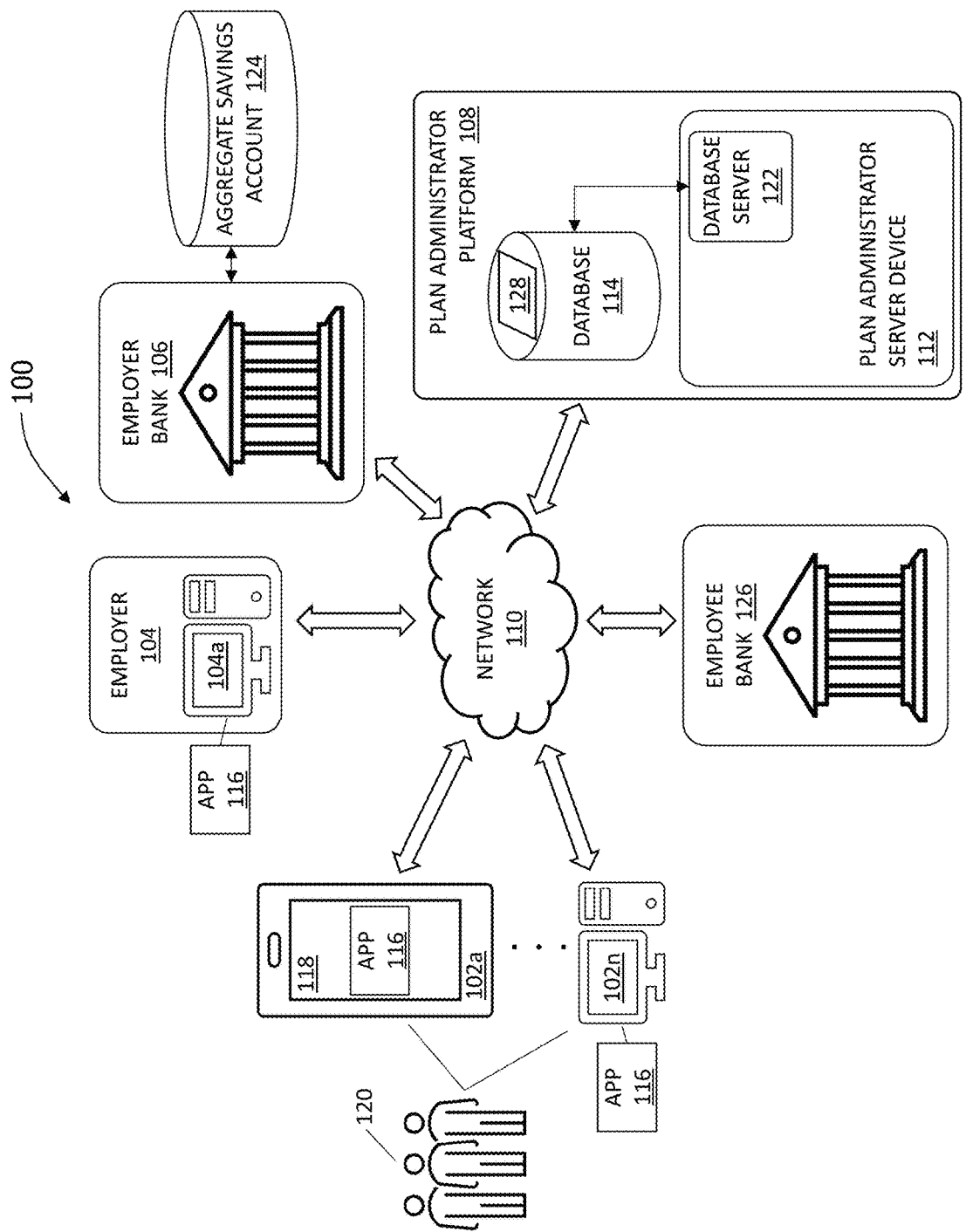
FIG. 1 is a block diagram of an example incentivized savings plan system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

The present disclosure provides various embodiments of a computer program, a method, and a system for automated savings and matching contributions. As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Moreover, as used herein, the term "employer" includes an entity (e.g., a corporate business entity) that employs one or more employees and that uses embodiments of the present disclosure to make matching contributions to an incentivized savings plan provided for the employer's employees. The term "employee" includes an entity (e.g., an individual) employed by the employer and that uses embodiments of the present disclosure to contribute money (broadly, funds) into the incentivized savings plan offered by the employer. The phrase "aggregated savings account" includes a direct deposit account (DDA), such as a checking account or savings account; a money market deposit account; a certificate of deposit; an investment account; or any other form of monetary account provided, for example, by a financial institution. The term "administrator" includes an entity that uses embodiments of the present disclosure to manage the incentivized savings plan, such as to facilitate those contributions made by the employer and the employee.

As will be described in more detail below, an employee may be working for an employer that provides an incentivized savings plan. An administrator, such as a third-party administrator may manage the incentivized savings plan provided by an employer. Broadly, the incentivized savings plan is an employer-sponsored plan allowing the employer's employees to make elective contributions to the incentivized savings plan via payroll deductions. In addition, the incentivized savings plan allows employers to make matching contributions for the employee's contributions, with such matching contributions being based on the matching contribution criteria established by the employer for the particular incentivized savings plan. As such, the administrator may use embodiments of the present disclosure to facilitate: 1) an employee making contributions into the aggregated savings account associated with the incentivized saving plan; and 2) an employer making contributions into the aggregated savings account on behalf of employees through one or more time-based matching contributions, traditional matching contributions, and the like. Although the following description is provided with respect to a single incentivized savings plan offered by a single employer, the administrator may manage multiple incentivized savings plans for individual employers or for multiple employers.

The computer program of embodiments of the present disclosure comprises a plurality of code segments, which are executable by a computing device for performing the steps of the method of the present disclosure, as described herein. The computer program, system, and method of embodiments of the present disclosure may be implemented in hardware, software, firmware, or combinations thereof using an incentivized savings plan system 100 (shown in FIG. 1).

Exemplary System

FIG. 1 is a block diagram of an example incentivized savings plan system 100, in accordance with one embodiment of the present disclosure. The incentivized savings plan system 100 includes one or more user computing devices 102a-102n (referred to herein collectively as user computing devices 102), an employer 104 having an employer computing device 104a, an employer bank 106, a plan administrator platform 108, and an employee bank 126 coupled in communication via a communications network 110. While shown as separate entities, in some embodiments, it is contemplated that the employer bank 106 and the plan administrator platform 108 are embodied as a single entity. The network 110 may be wired or wireless and includes, for example and without limitation, one or more of a local area network (LAN), a wide area network (WAN) (e.g., the Internet, etc.), a mobile network, a virtual network, a cloud network, and/or any other suitable public and/or private network capable of facilitating communication among the user computing devices 102, the employer computing device 104a, the employer bank 106, the plan administrator platform 108, and/or the employee bank 126. The network 110 may include servers, routers, switches, wireless receivers and transmitters, and the like, as well as electrically conductive cables or optical cables. The network 110 may also include cellular or mobile phone networks, as well as landline phone networks, public switched telephone networks, fiber optic networks, or the like.

In some embodiments, the network 110 includes more than one type of network, such as a private transaction network provided by the plan administrator platform 108 to the employer computing device 104a, the employer bank 106, and the employee bank 126, and, separately, the public Internet, which may facilitate communication between the user computing devices 102, the employer computing device 104a, the plan administrator platform 108, and/or the employee bank 126. Although parts of the incentivized savings plan system 100 are presented in one arrangement, other embodiments may include the same or different parts arranged otherwise, depending, for example, on authentication and consent processes, communication between computing devices, etc.

As described further herein, the server devices, such as a plan administrator server device 112, include computing devices that may provide access to one or more general computing resources, such as Internet services (via the network 110), electronic mail services, data transfer services, and the like. The server devices may also provide access to a database 114 of the plan administrator platform 108. The database 114 stores, for example, information and data necessary for the implementation of the computer program, method, and system of embodiments of the present disclosure.

In the exemplary embodiment, each of the user computing devices 102 communicate with one or more of the employer computing device 104a, the plan administrator platform 108 (via the plan administrator server device 112), and the employee bank 126, for example, via the network 110. The user computing devices 102 communicate with the plan administrator server device 112, for example, to exchange and/or synchronize authentication, consent, and/or financial account data via, for example, a plan administration application (App) 116. The plan administrator server device 112 accesses the network 110 to communicate with the user computing devices 102, the employer computing device 104a, the employer bank 106, and the employee bank 126 to facilitate linking to or the establishment of an incentivized savings plan, and the exchange of financial account data with the employer computing device 104a, the employer bank 106, and the employee bank 126.

Each of the user computing devices 102 and 104a can be any computing device capable of interconnecting to the network 110, such as the Internet, including desktop computers, work stations, laptop computers, mobile web-based devices, smartphones, palmtop computers, tablet computers, PDAs, or other mobile web-based connectable equipment (including wireless devices). The user computing devices 102 are interconnected to the Internet through one or more interfaces including a network, such as a local area network (LAN) or a wide area network (WAN), dial-in-connections, cable modems, wireless modems, and special high-speed ISDN lines. In addition, in the example embodiment, the user computing devices 102 are configured to communicate with other computing devices (not shown) using various forms of communication including, for example, radio frequency communication, near field communication (NFC), network-based communication, and the like. In preferred embodiments, the user computing devices 102 include an electronic display operable to display visual graphics, images, text, etc. In certain embodiments, the computer program of the present disclosure facilitates interaction and communication through a graphical user interface (GUI) 118 that is presented via the electronic display. The GUI 118 enables a user 120 (also referred to herein as an employee or individual) to interact with the user computing device 102, for example, by touching or pointing at display areas to provide information to the computing device 102.

Furthermore, as described further herein, each of the server and/or computing devices (e.g., the user computing devices 102, the employer computing device 104a, and/or the plan administrator server device 112) may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices may further include file stores comprising a plurality of hard disk drives, network attached storage, and/or a separate storage network.

In the exemplary embodiment, the plan administrator platform includes the plan administrator server device 112. The plan administrator server device 112 includes, for example, a database server 122, which is connected to the database 114. In one embodiment, the database 114 is stored on the plan administrator server device 112. In an alternative embodiment, the database 114 may be stored remotely from the plan administrator server device 112 and/or may be non-centralized. The database 114 is configured to receive and store user account data and/or incentivized savings plan data. In one embodiment, the database 114 includes an incentivized saving plan (ISP) transaction table 128. The ISP transaction table 128 includes, for example, transaction data indicative of employee and/or employer contributions and/or withdrawals from the incentivized savings plan. The transaction data may be stored in the ISP transaction table 128 as one or more employee contribution transaction records (associated with employee contributions), employer contribution transaction records (associated with employer contributions), and employee withdrawal records (associated with employee withdrawal transactions). Each of the employee contribution transaction records, employer contribution transaction records, and employee withdrawal records is also associated with a respective timestamp (i.e., a contribution timestamp or a withdrawal timestamp). It is contemplated that the ISP transaction table 128 may include one or more tables, arrays, linked lists, queues, or any other data structures that enables the incentivized savings plan system 100 to function as described herein. The term "record," as used herein, includes a data structure, such as a row or set of data fields in a database table related to a discrete transaction The computer program of the present disclosure may run on the user computing devices 102 or, alternatively, may run on one or more of the server devices. In certain embodiments of the present disclosure, the computer program may be embodied in a stand-alone computer program (e.g., the App 116) downloaded and installed on a user's computing device 102 or in a web-accessible program that is accessible by the user's computing device 102 via the communications network 110. As used herein, the App 116 is embodied as an electronic resource from which the users 120 can interact with various embodiments of the present disclosure.

Certain embodiments of the present disclosure provide the users 120 with different types of accounts. Each type of user account provides its respective users 120 with unique roles, capabilities, and permissions with respect to implementing embodiments of the present disclosure. For instance, an employee (i.e., a user 120) may be provided with an employee account that permits the employee to access embodiments of the present disclosure for purposes of making contributions into an aggregated savings account 124 from the employee's paycheck, withdrawing money from the aggregated savings account 124, viewing an employee balance of the aggregated savings account 124, and viewing the employee's transaction activity for the aggregated savings account 124. Additionally, the employer 104 may be provided with an employer account that permits the employer 104 to access embodiments of the present disclosure for purposes of making matching contributions into the aggregated savings account 124, viewing a balance of the aggregated savings account 124, and viewing employer transaction activity for the aggregated savings account 124. In addition to those accounts noted above, embodiments of the present disclosure may include any number and/or any specific types of account as may be necessary to carry out the functions, features, and/or implementations of the present disclosure, as described herein. For example, some embodiments may provide for an administrator account ("admin account") that is used by an administrator user ("admin user") to implement various embodiments of the present disclosure.

Upon an employee 120 and/or an employer 104 logging in to the electronic resource 116 for a first time, the employee 120 and/or the employer 104 may be required to provide various pieces of identification information to create their respective accounts. Such identification information may include, for example, personal name, business name, physical address, email address, telephone number, social security number, or the like. For the employer 104 creating an incentivized savings plan, the employer 104 may be required to establish the aggregated savings account 124 and to provide information regarding such aggregated savings account 124 (e.g., bank account number, routing number, etc.). Upon providing the identification information, the employee 120 and/or the employer 104 may be required to enter (or may be given) a username and password, which will be required to access the electronic resource 116 in subsequent uses.

Exemplary System Implementation

Figure 2:
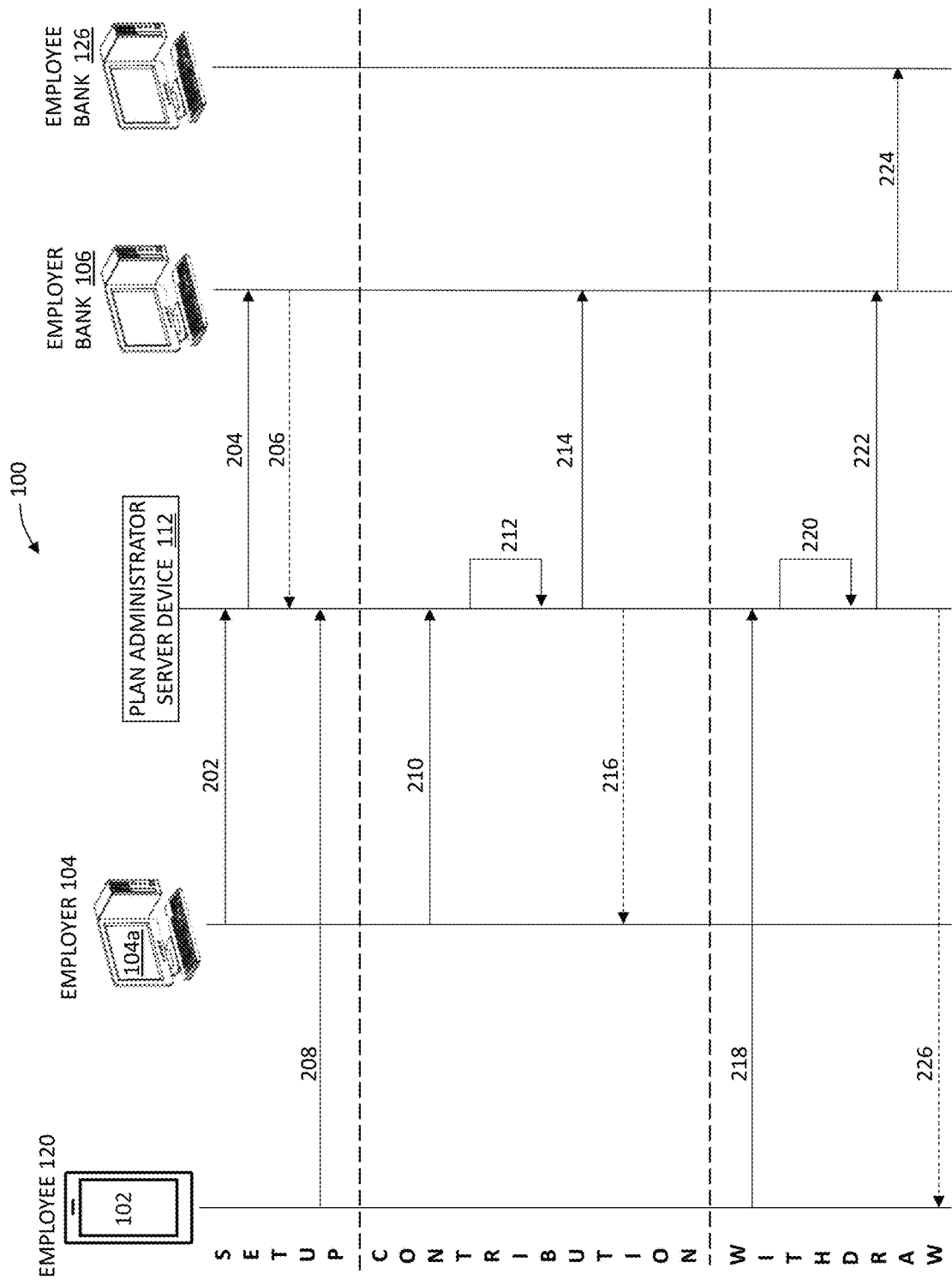
FIG. 2 is a flowchart illustrating various example actions performed by components of the incentivized savings plan system of FIG. 1 to establish the incentivized savings plan and employee participation.

FIG. 2 is a flowchart illustrating various example actions performed by components of the incentivized savings plan system 100 to establish the incentivized savings plan and employee participation. The flowchart is generally divided into three (3) sections: SETUP, CONTRIBUTION, and WITHDRAW. The SETUP section includes step 202-208; the CONTRIBUTION section includes steps 210-216; and the WITHDRAW section includes steps 218-226.

In the exemplary embodiment, at step 202, an employer 104 creates an employer account with the plan administrator service device 112. More specifically, the plan administrator service device 112 receives an input from the employer computing device 104a, for example, via the App 116 over the network 110 (each shown in FIG. 1), indicating that the employer 104 selected to establish an incentivized savings plan. For example, in one embodiment, the employer 104, upon creating the employer account, uses the employer computing device 104a to access the App 116 through the communications network 110. Initially, the employer 104 may create an incentivized saving plan through which the employer's employees 120 can contribute money via the aggregated savings account 124 (shown in FIG. 1). FIG. 4A depicts an example screen that may be presented to the employer 104 vis the App 116. A display device 402 of the employer computing device 104a presents a signup screen, which includes an EMPLOYEE selection icon 404 and an EMPLOYER selection icon 406.

Figure 4B:
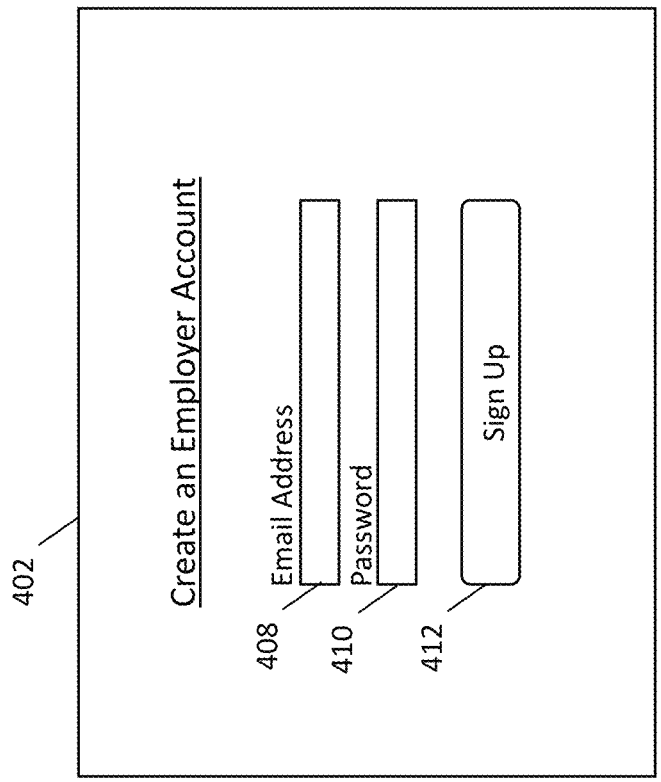
FIG. 4B depicts an example account creation screen that may be presented to the employer via the software application shown in FIG. 1.
Figure 4A:
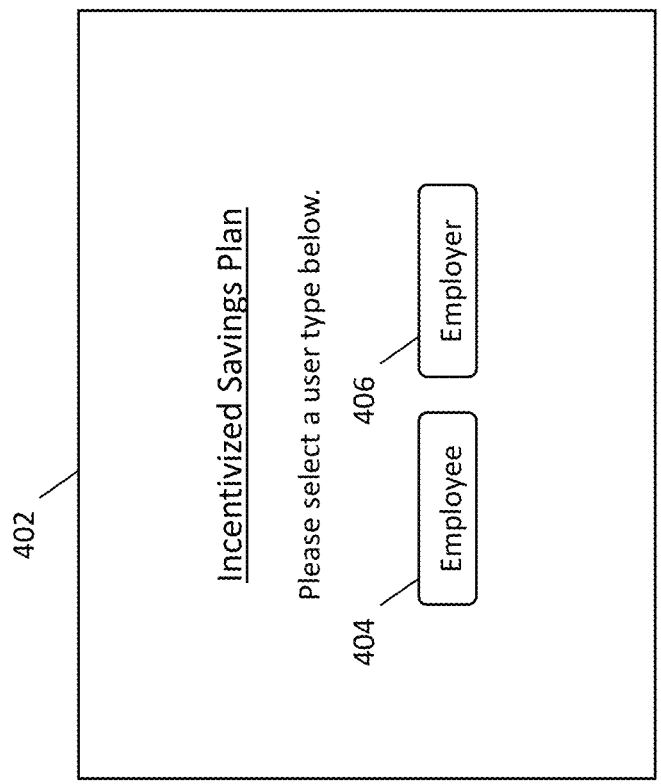
FIG. 4A depicts an example screen that may be presented to the employer via a software application shown in FIG. 1.

Upon selection of the EMPLOYER selection icon 406, the APP 116 presents an account creation screen, depicted in FIG. 4B. The account creation screen includes an input box 408 for receiving an email address to be associated with the employer account, and an input box 410 for receiving a password to be associated with the employer account. Upon input of the email address and password, the employer 104 may select a SIGN UP icon 412 to complete the account sign up process.

The employer 104 may provide plan data to the plan administrator server device 112. For example, the App 116 may display one or more screens (not shown) to the employer 104 for receiving various inputs and plan data related to the incentivized savings plan. The plan data includes, for example, matching contribution criteria, as will be described in more detail below, which define how matching contributions will be made by the employer 104 into the aggregate saving account 124 on behalf of the employees 120. In addition, the plan data may include, for example, and without limitation, employer contact information, a list of employees of the employer 104, employee groups, plan timeframe, exclusion information, and the like. The plan data may be stored by the plan administrator server device 112 in the database 114 (shown in FIG. 1). The employer 104 may then be presented with an employer dashboard (shown in FIG. 5) for viewing the incentivized savings plan status and data, making changes to the plan, etc. For example, as described herein, by accessing the employer account, the employer 104 may view a balance of the aggregated savings account 124, view each employee balance within the aggregated savings account 124, and view transaction activity for the aggregated savings account 124, among other things. It is contemplated that, in some embodiments, instead of creating an aggregated savings account for all employees 120, the employer 104 could create an individual savings account for each employee 120. Thus, the system and method may operate with aggregated accounts and/or individual accounts.

Referring back to FIG. 2, at step 204, upon creation of the incentivized savings plan by the employer 104, the plan administrator server device 112 may contact the employer bank 106 to create or link to the aggregated savings account 124. At step 206, the plan administrator service device 112 receives confirmation of creation/linking to the aggregated savings account 124. For example, in one suitable embodiment, upon creation of the incentivized savings plan by the employer 104, the plan administrator service device 112 communicates with one or more computing devices of the employer bank 106 and opens a new aggregated savings account 124, which is linked to a funding account associated with the employer 104. Alternatively, in one embodiment, the plan administrator service device 112 receives, from the employer 104, account information associated with the aggregated savings account 124. The account information may be provided during the creation of the incentivized savings plan by the employer 104. In such an embodiment, the plan administrator service device 112 communicates with the employer bank 106 to establish a communicative link with the aggregated savings account 124.

At step 208, an employee 120 creates an employee account with the plan administrator service device 112. More specifically, the plan administrator service device 112 receives an input from a user computing device 102, for example, via the App 116 over the network 110, indicating that the employee 120 selected to establish an employee account with the incentivized savings plan. In one embodiment, the employee 120 may be presented with the signup screen shown in FIG. 4A. Upon selection of the EMPLOYEE selection icon 404, the APP 116 presents an account creation screen that is substantially similar to the screen depicted in FIG. 4B. In one embodiment, the employee 120 elects to participate in the employer's incentivized savings plan by granting permission to a plan administrator administrating the incentivized savings plan via the plan administrator server device 112 to automatically deduct a portion of the employee's paycheck as a contribution into the employer's aggregated savings account.

Figure 3:
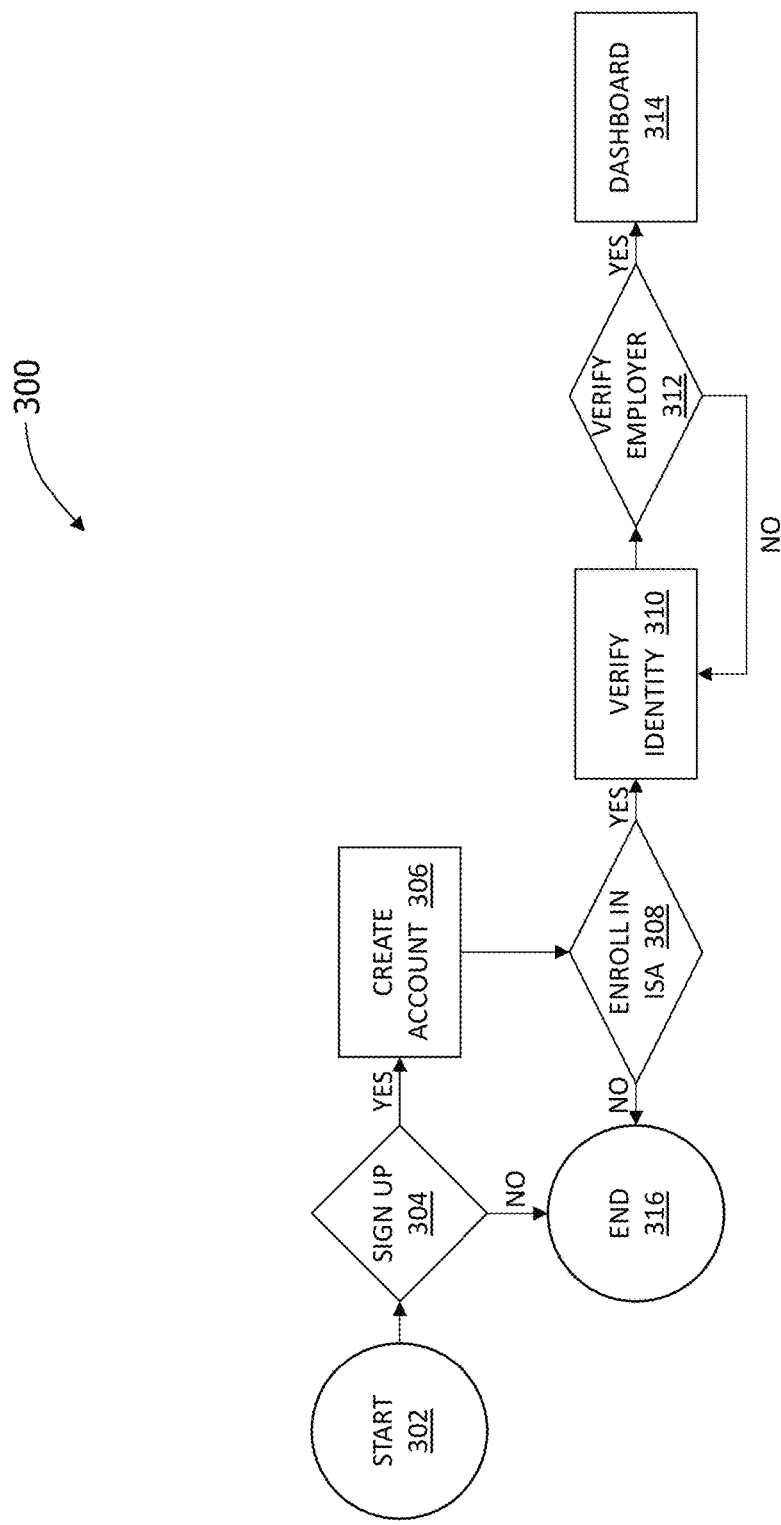
FIG. 3 is a flowchart illustrating various example actions of a registration process performed by components of the incentivized savings plan system of FIG. 1 to register an employee for participation in the incentivized savings plan.

FIG. 3 is a flowchart illustrating various example actions of a registration process 300 performed by components of the incentivized savings plan system 100 to register an employee 120 for participation in the incentivized savings plan. The process 300 begins at 302. The employee 120 runs or otherwise interacts with the App 116 (shown in FIG. 1). At step 304, the App 116 presents to the employee an option to select to sign up for the incentivized savings plan (i.e., create the employee account), as depicted in FIG. 4A. If the employee 120 selects not to sign up for an account, the process 300 ends at step 316. If the employee 120 selects to sign up for an account, an account is created at step 306. At step 308, the employee 120 is presented with an option to enroll his or her account in the incentivized savings plan. If the employee does not select to enroll in the incentivized savings plan at this time, the process 300 ends at step 316. If the employee 120 selects to enroll in the incentivized savings plan, the process 300 proceeds to verify the identity of the employee 120 at step 310. For example, the employee 120 may be asked to enter his or her name, date of birth, SSN, etc. At step 312, the employee is asked to select and/or input the employee's employer information. If the employee information and/or the employer information cannot be verified, the process 300 returns to step 310 to again verify the employee/employer. If the information is verified, the employee 120 is presented with an employee dashboard for the incentivized savings plan at step 314. An example employee dashboard is depicted in FIG. 6. As discussed herein, through the employee account, the employee 120 may view his or her employee account balance. The employee account balance represents the amount of money in the aggregated savings account 124 associated with the employee 120. In some embodiments, the employee 120 can only see his or her own money, while in other embodiments, the employee may see all of the money in the aggregated savings account 124 in addition to viewing his or her personal balance. The employee 120 may also view, from the employee dashboard, a transaction history detailing every contribution associated with the employee's account.

Referring back to FIG. 2, the employee 120 further provides bank account information, plan participation information, etc. to the plan administrator server device 112. The bank information may include, for example, account information associated with one or more user accounts held at the employee bank 126 (shown in FIG. 1), such as a bank routing number, bank account number, etc. The plan participation information may include, for example, an amount of the employee's pay to be withheld as the employee's contribution to the incentivized savings plan. For example, the amount can be a fixed dollar amount, a percentage of each pay period, and/or any other amount allowed by the incentivized savings plan. The employee account and employee information may be stored by the plan administrator server device 112 in the database 114 (shown in FIG. 1).

After the incentivized savings plan is established and one or more employees are enrolled, the plan administrator server device 112 automatically administers the plan according to the employer and employee rules/selections. At step 210, the employer 104 provides to the plan administrator server device 112, via the employer computing device 104a, payroll information. Based on the payroll information and the employee plan participation information, the plan administrator server device 112 determines, at step 212, contribution amounts for each of the participating employees and the employer. All employee contributions will be identified as part of the employee's savings balance, which is a portion of the aggregated savings account 124 that is attributable to the employee 120. Each contribution made by the employee 120 is associated with a timestamp (also referred to herein as a contribution timestamp), indicating the date and time of the contribution (e.g., a payroll date).

At step 214, the plan administrator server device 112 communicates with a computing device of the employer bank 106 and instructs the bank to deposit an amount equal to the contribution amounts for each of the participating employees and the employer, as determined in step 212. In particular, the amount is deposited into the aggregated savings account 124, having been withdrawn from the linked funding account associated with the employer 104. In one embodiment, once a contribution made by the employee is determined to meet the employer's matching contribution criteria, then the employer 104 (via the plan administrator) automatically deposits a matching contribution into the aggregated savings account 124 and the plan administrator credits the employee's savings balance to include the amount of the matching contribution. At any time, the employee 120 may withdraw money from the employee savings balance of the aggregated savings account 124; however, such a withdrawal may impact if and/or when the employer 104 makes another matching contribution. At step 216, the plan administrator server device 112 transmits a notification to the employer 104 (via the employer computing device 104a) notifying the employer 104 of the transfer of funds to the aggregated savings account 124. As described further herein, the notification can take the form of one or more periodic reports indicating the current status of the incentivized savings plan, employee accounts, employer matching amounts, etc.

Figure 7:
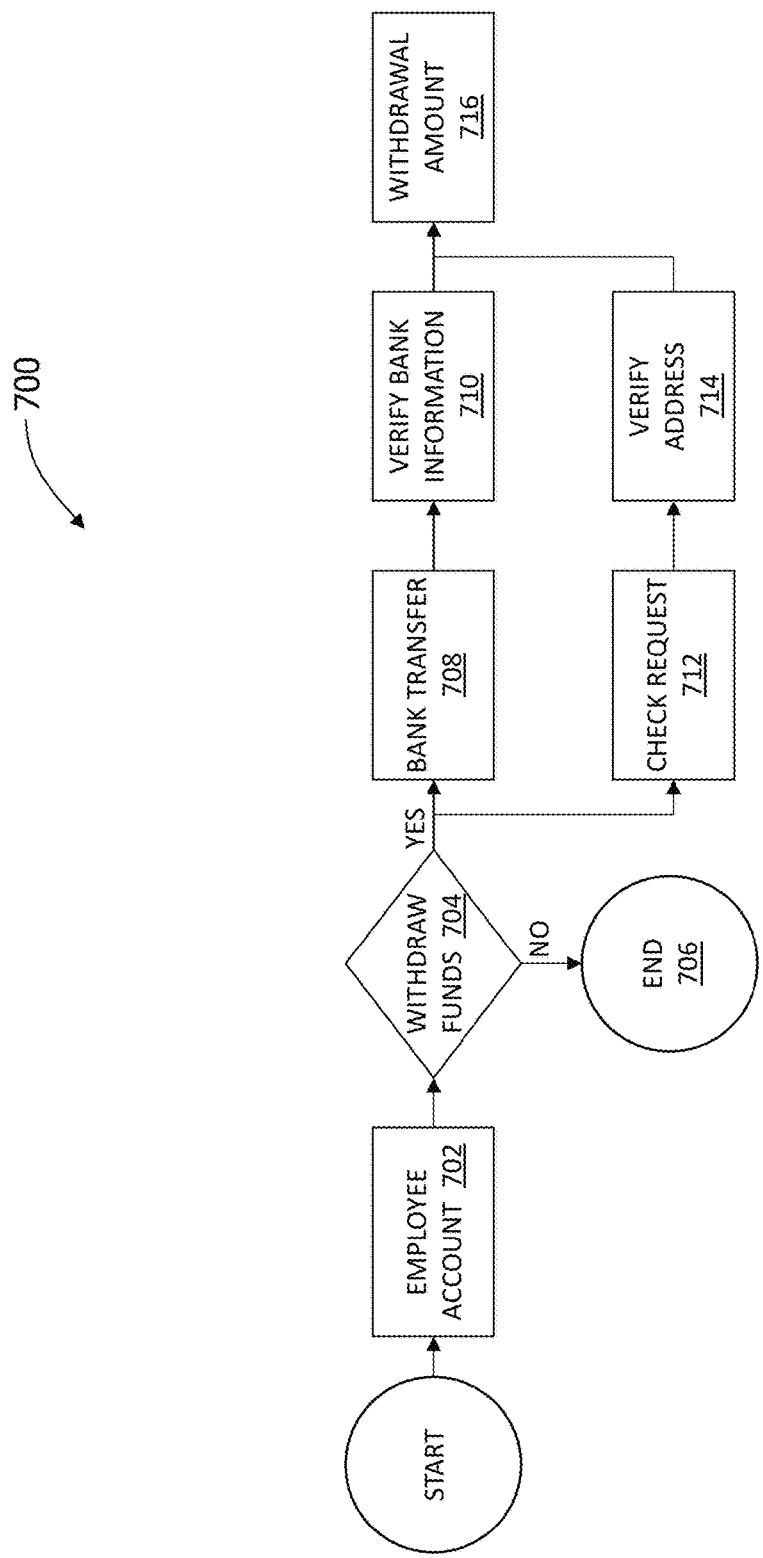
FIG. 7 is a flowchart illustrating various example actions of a withdrawal request process performed by components of the incentivized savings plan system shown in FIG. 1.

At step 218, an employee 120 may request withdrawal of at least a portion of funds associated with the employee's account associated with the incentivized savings plan. FIG. 7 is a flowchart illustrating various example actions of a withdrawal request process 700 performed by components of the incentivized savings plan system 100. At step 702, the employee 120 runs or otherwise interacts with the App 116 (shown in FIG. 1) to login to the employee account and display the employee dashboard (shown in FIG. 6). At step 704, the App 116 presents to the employee an option to withdraw funds from the incentivized savings plan. If the employee 120 does not select to withdraw any funds, the process 700 ends at step 706. If the employee 120 selects to withdraw an amount of funds, the App 116 presents to the employee options to initiate a bank transfer at step 708 or initiate a check request at step 712. If the employee 120 selects to initiate a bank transfer, at step 710, the employee 120 verifies the bank information he or she provided during account setup. At step 716, the employee provides a withdrawal amount. If the employee 120 selects to initiate a check request, at step 714, the employee 120 verifies his or her mailing address. In addition, as described above, the employee provides a withdrawal amount at step 716

Referring back to FIG. 2, at step 220, the plan administrator server device 112 determines whether at least a portion of the requested amount is eligible for withdrawal. If no funds are eligible for withdrawal, the plan administrator server device 112 may notify the employee that the request is denied. However, if the plan administrator server device 112 determines that at least a portion of the funds is eligible for withdrawal, at step 222, the plan administrator server device 112 contacts the employer bank 106 with a request to transfer the determined portion of funds to the respective employee's employee bank 126. At step 224, the employer bank 106 initiates a transfer of the fund amount to the employee bank 126. At step 226, the plan administrator server device 112 notifies the employee of the funds transfer.

The system 100 describe above may include more, fewer, or alternative components, and/or perform more, fewer, or alternative actions, including those discussed elsewhere herein, and particularly those discussed below in describing the computer-implemented method.

Exemplary Computer-Implemented Methods

Setting Up Incentivized Savings Plan

Figure 8:
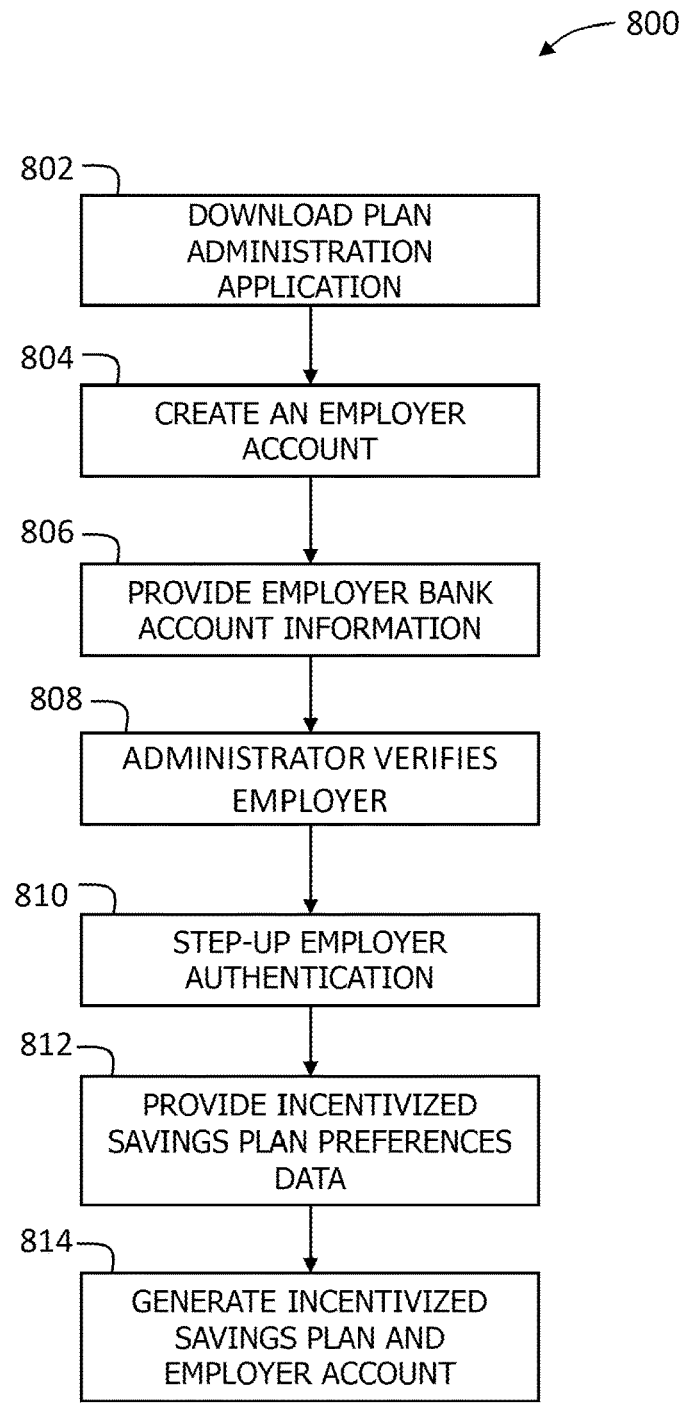
FIG. 8 is a flowchart illustrating an exemplary computer-implemented method for registering an employer with the plan administrator platform (shown in FIG. 1) and setting up an incentivized savings plan, in accordance with one embodiment of the present disclosure.

FIG. 8 is a flowchart illustrating an exemplary computer-implemented method 800 for registering an employer, such as the employer 104 (shown in FIG. 1), with the plan administrator platform 108 (shown in FIG. 1) and setting up an incentivized savings plan, in accordance with one embodiment of the present disclosure. The operations described herein may be performed in the order shown in FIG. 8 or may be performed in a different order. Furthermore, some operations may be performed concurrently as opposed to sequentially. In addition, some operations may be optional.

The computer-implemented method 800 is described below, for ease of reference, as being executed by exemplary devices and components introduced with the embodiments illustrated in FIGS. 1-7. In one embodiment, the method 800 may be implemented by the incentivized savings plan system 100 (shown in FIG. 1). In the exemplary embodiment, the method 800 relates to the receiving of employer registration information from an employer computing device 104a (shown in FIG. 1) upon registration for the employer account and creation of the incentivized savings plan. While operations within the method 800 are described below regarding the employer computing device 104a, the method 800 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

It should be noted that while the following description use the term "employer 104," the actual operations being performed may be performed by a representative of the employer 104. As such, when an operation described below is inherently performed by an individual, it is noted that a representative of the employer 104 is performing the operation.

The employer 104 must be registered with the plan administrator platform 108 in order to establish the incentivized savings plan. Referring to step 802, in the example embodiment, the employer 104 downloads a plan administration application, such as, for example, and without limitation, the App 116 (shown in FIG. 1). The employer 104 may connect to the plan administrator server device 112 (e.g., via a web browser), which may instruct the employer 104 to download the App 116 to the employer computing device 104a for direct communication with the plan administrator server device 112 via the network 110, e.g., without use of a web browser. When the employer 104 uses the App 116, a direct link is established via a wireless connection, for example, via a Wi-Fi connection to the network 110. In an alternative embodiment, the employer 104 may connect to the plan administrator server device 112, for example, via a web service providing account registration.

In the exemplary embodiment, the employer computing device 104a, such as a web-based smartphone, is configured to execute for presentation the App 116. In some embodiments, the App 116 may be stored in a cloud-based interface, which may include cloud storage capability as well as any cloud-based API that facilitates communication between the employer computing device 104a and the plan administrator server device 112. The App 116 facilitates transmitting and receiving data between the employer computing device 104a and the plan administrator server device 112 for registering (or enrolling) the employer 104, linking the employer bank 106, and creating the incentivized savings plan.

At step 804, the employer 104 is presented an option to create an employer account. For example, the employer 104 registers or enrolls for the employer account via the App 116 or via a suitable webpage of the plan administrator server device 112 using, for example, the employer computing device 104a. It should be understood that the employer 104 may enroll or register with the incentivized savings plan in any of several ways, including utilizing other computing devices to access the plan administrator server device 112 via the Internet and providing the requisite information. During employer enrollment, the employer 104 may provide enrollment data including basic information about the employer (e.g., business name, address, phone number, etc.).

At step 806, the employer 104 may provide information concerning the employer bank 106, and more specifically, an account associated with the employer 104 held by the employer bank 106. The information may include, for example, a bank routing number, account number, etc. At step 808, the plan administrator server device 112 authenticates or verifies the employer 104 and the employer information. For example, and without limitation, the employer 104 may be asked to input a string of characters transmitted to the employer's work email account. The values entered by the employer 104 may be used by the plan administrator server device 112 to authenticate or verify the employer 104 prior to setting up the employer account and associating the employer 104 and the employer's bank account to the employer account. For example, the plan administrator server device 112 compares the entered values to the values associated with the employer verification email stored in a database (e.g., the database 114 shown in FIG. 1). If the entered values match the stored values, the employer 104 is authenticated or verified.

Alternatively, the plan administrator server device 112 may authenticate the employer 104 via a one-time code sent to the employer 104 via, for example, Short Message Service (SMS), through a call center communication, and the like. Optionally, the method 800 may include an additional step for authenticating the employer 104 offline. For example, and without limitation, the plan administrator server device 112 may provide an offline PIN to the employer 104 via mail.

In some embodiments, at optional step 810, the plan administrator server device 112 requests that the employer 104 set up a step-up authentication method, i.e., two-factor authentication. The additional authentication measures may be taken before the incentivized savings plan is created by the employer 104. For example, and without limitation, in one embodiment, the employer 104 is requested to establish account access credentials, e.g., to select a username and password or PIN (personal identification number) to be used for security purposes, and/or for use by the employer 104 to login and change one or more preferences and/or settings. In addition to the password or PIN, the employer 104 may be requested to set up a second authentication factor, including, for example, and without limitation, providing a biometric sample of an authorized employer representative that is to be associated with the other registration information provided.

Biometric samples include, without limitation, a fingerprint image, a voice recording, a retinal image, facial recognition, palm print image, iris recognition, and the like. The biometric sample is unique to the authorized employer representative and difficult to duplicate and/or forge by an unauthorized user. The biometric sample may be stored and associated with a biometric identifier, for example, by the plan administrator server device 112 (e.g., in the database 114, etc.). Additionally, the biometric identifier may be associated with the stored registration information and facilitates secure authorization of requested data input by the employer 104. A biometric input device in communication with the employer computing device 104a may be used for the authorized employer representative to enter the biometric sample. For example, the employer computing device 104a may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code is sent to the user's mobile device via SMS), Time-Based One Time Password (TOTP) authentication (where an authenticator application provides a short code as a second factor), push-based two-factor authentication (where a prompt is sent to the user's mobile device), or any other two-factor authentication method that enables the method 800 to operate as described herein.

Figure 5:
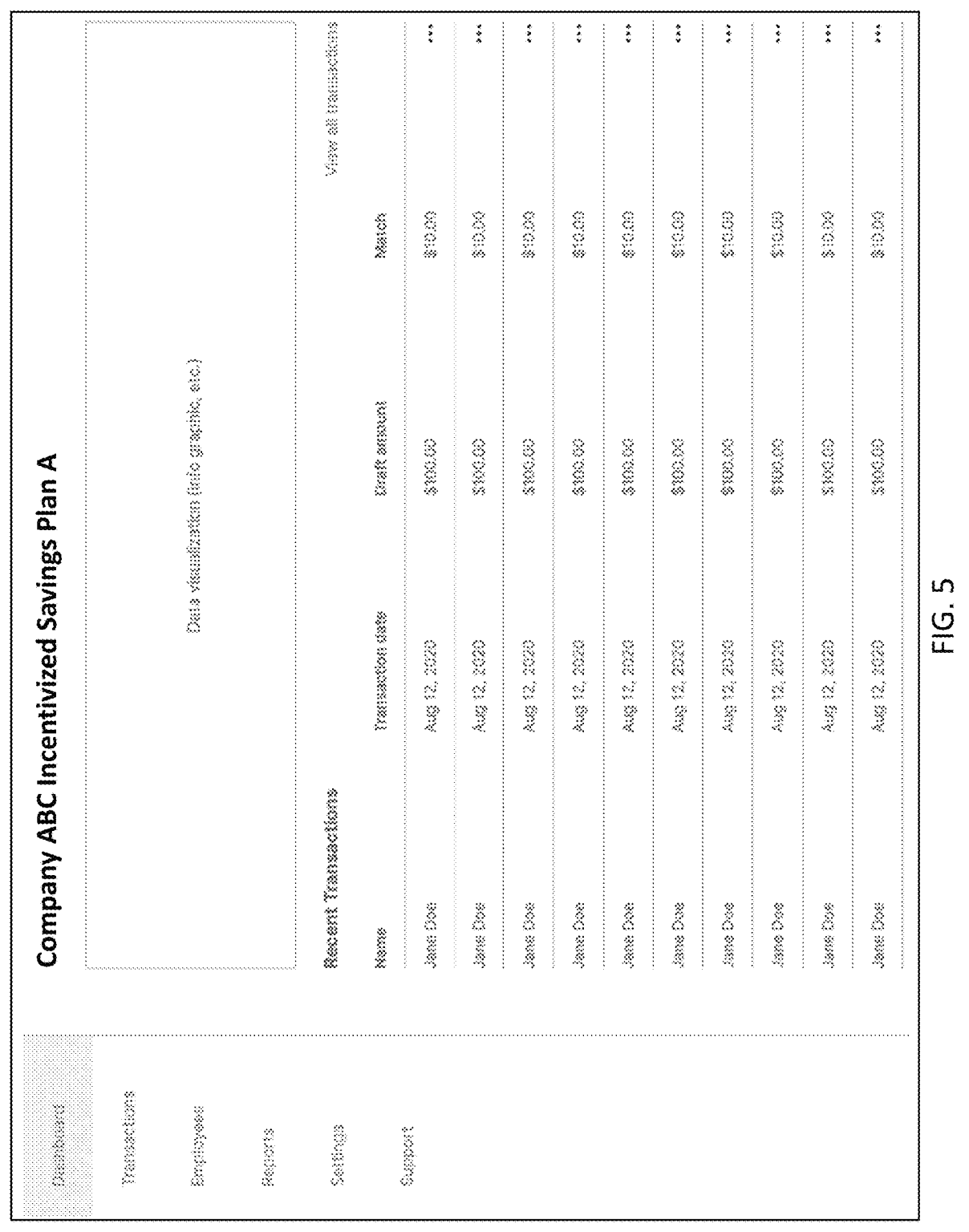

The employer 104 may be presented with the employer dashboard (shown in FIG. 5). At step 812, the plan administrator server device 112 may request that the employer 104 setup the incentivized savings plan preferences data that may be used to create and operate the incentivized savings plan. The incentivized savings plan preferences data may then be saved, for example, as part of the account data of the employer account in the database 114.

As described herein, when creating the incentivized savings plan, the employer 104 may establish timing criteria (i.e., the incentivized savings plan preferences data) for making matching contributions, such as the timing of the matching contributions, the amount of the matching contributions per time period, and the maximum amount of matching contributions time periods. The employer 104 may select any time threshold, time period threshold, and/or interval threshold (or no thresholds at all) for when a specified matching contribution is to be made, and may select the amount of money the employer 104 will match for the employee contribution time or date meeting or exceeding the thresholds. As described further herein, to determine whether a matching contribution should be made, the employer selected timing criteria is compared against a contribution timestamp for a particular employee contribution. If the lapsed time since the date of the contribution timestamp exceeds the selected timing criteria, then an employer contribution will be made according to a designated matching contribution amount for the selected time. The matching contribution may be flat dollar amount, a percentage of the employee contribution, or may be determined based on any formula specified by the employer 104. In some embodiments, the employer 104 may forgo establishing any timing criteria, thereby creating the incentivized savings plan having immediate, automatic employer matching contributions (subject to any matching caps or formulas, as described below).

The employer 104 may set a matching cap for the amount of money that may be matched in a given time period, and the employer 104 may set different matching caps over different time periods. For example, in one embodiment, the employer 104 could set a lifetime matching contribution capped at $2,500 per employee 120, and/or the employer 104 could set a yearly matching contribution capped at $1,000 per year per employee 120. The matching cap may be imposed on a per employee basis, per time period basis, and/or the matching cap may be based on the aggregate amount the employer 104 contributes in a given time period for all employees 120. The matching cap may be set at different amounts for different employees 120. For example, in another embodiment, the matching cap may be set at a first matching cap amount for one employee or class of employees, and the matching cap may be set at a second matching cap amount for a different employee or class of employees.

Additionally, the employer 104 may set a rate cap on the amount of money matched for a particular contribution. For example, in some embodiments, the employer 104 may cap the matching contribution at 50% of the employee contribution amount. Thus, if an employee 120 deposits $1,000 into the employer's aggregated savings account 124, then the employer 104 will continue issuing matching contributions until the employer 104 has matched $500 or 50% of the employee's contribution.

The employer 104 may choose to apply a first-in, first-out (FIFO) rule for withdrawal of all contributions—both employee and employer. For example, in one embodiment, if an employee contribution is made first, an employer matching contribution is made second, and then another employee contribution is made third, an employee withdrawal would begin by subtracting funds from the first (employee) contribution, then the employer matching contribution, and then the third (employee) contribution. Alternatively, the employer 104 may choose to apply any withdrawal rule that enables the plan administrator platform 108 to function as described herein. For example, and without limitation, the employer 104 may define a rule where withdrawal amounts are: applied to employee contributions first and employer contributions second; applied to employer contributions first and employee contributions second; applied in a last-in, first-out manner; and the like.

In some embodiments, the employer 104 may setup one or more conditions that must be met before an employee 120 is granted a matching contribution. For example, the employer 104 may grant a matching contribution for keeping a previously issued matching contribution in the aggregated savings account 124 for a specified period. Like employee contributions, the employer's matching contributions are also timestamped (employer contribution timestamps) with the date and/or time of the contribution. If the employee 120 keeps a first matching contribution in the aggregated savings account 124 for a specified period of time, then the employer 104 may make a second matching contribution based on the employee having saved the first matching contribution.

At step 814, the plan administrator server device 112 generates the incentivized savings plan for the employer 104, associating the incentivized savings plan preferences data, employer information, and employer bank account information with the employer account along with the employer's account access credentials, and stores the employer account in a database (e.g., the database 114).

Setting Up Employee Account

Figure 9:
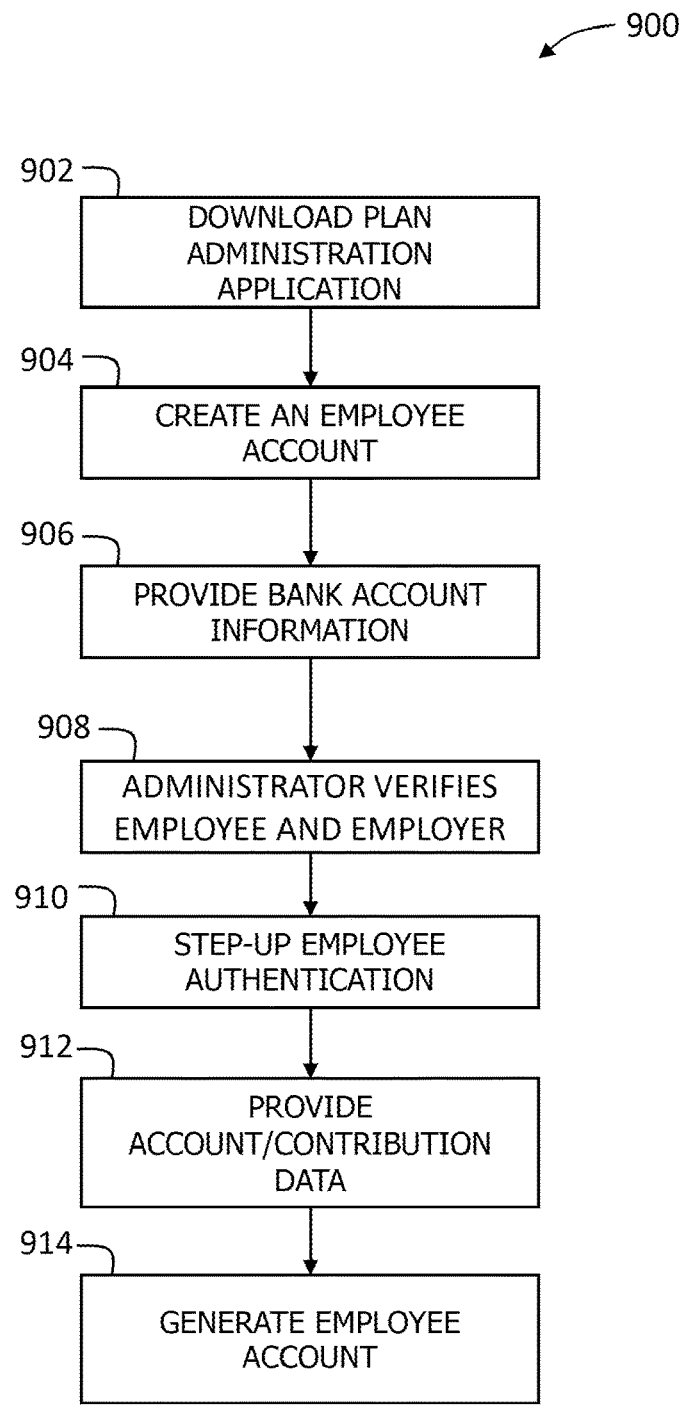
FIG. 9 is a flowchart illustrating an exemplary computer-implemented method for registering an employee for an employee account with the incentivized savings plan, in accordance with one embodiment of the present disclosure.

FIG. 9 is a flowchart illustrating an exemplary computer-implemented method 900 for registering a user, such an employee 120, for an employee account with the incentivized savings plan, in accordance with one embodiment of the present disclosure. The steps described herein may be performed in the order shown in FIG. 9 or may be performed in a different order. Furthermore, some steps may be performed concurrently as opposed to sequentially. In addition, some steps may be optional.

The computer-implemented method 900 is described below, for ease of reference, as being executed by exemplary devices and components introduced with the embodiments illustrated in FIGS. 1-7. In one embodiment, the method 900 may be implemented by the incentivized savings plan system 100 (shown in FIG. 1). In the exemplary embodiment, the method 900 relates to the receiving of employee registration information from a user computing device 102 (shown in FIG. 1) upon registration for the employee account. While steps within the method 900 are described below regarding the user computing device 102, the method 900 may be implemented on the employer computing device 104a as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

The employee 120 must be registered for the incentivized savings plan to participate therein, i.e., have payroll contributions made on his or her behalf. Referring to step 902, in the example embodiment, the employee 120 downloads a plan administration application, such as, for example, and without limitation, the App 116 (shown in FIG. 1). The employee 120 may connect to the plan administrator server device 112 (e.g., via a web browser), which may instruct the employee 120 to download the App 116 to the user computing device 102 for direct communication with the plan administrator server device 112 via the network 110, e.g., without use of a web browser. When the employee 120 uses the App 116, a direct link is established via a wireless connection, for example, via a Wi-Fi connection to the network 110. In an alternative embodiment, the employee 120 may connect to the plan administrator server device 112, for example, via a web service providing account registration.

In the exemplary embodiment, the user computing device 102, such as a web-based smartphone, is configured to execute for presentation the App 116. In some embodiments, the App 116 may be stored in a cloud-based interface, which may include cloud storage capability as well as any cloud-based API that facilitates communication between the user computing device 102 and the plan administrator server device 112. The App 116 facilitates transmitting and receiving data between the user computing device 102 and the plan administrator server device 112 for registering (or enrolling) the employee 120, selecting payroll contribution amounts, and requesting funds withdrawal from the incentivized savings plan.

At step 904, the employee 120 is presented an option to create an employee account. For example, the employee 120 registers or enrolls for the employee account via the App 116 or via a suitable webpage of the plan administrator server device 112 using, for example, the user computing device 102 or the employer computing device 104a. It should be understood that the employee 120 may enroll or register with the incentivized savings plan in any of several ways, including utilizing the employer computing device 104a to access the plan administrator server device 112 via the Internet and providing the requisite information. During employee enrollment, the employee 120 may provide enrollment data including basic information about himself or herself (e.g., name, address, phone number, etc.) and, in some embodiments, provide information regarding the employee's mobile devices (for example, by providing a SIM identifier and/or a mobile telephone number and/or other mobile device identifier). It is noted that the employee account can be linked to other employer services if the employee 120 is already signed up for other unrelated employer services. In some embodiments, the information obtained from the employee 120 during the enrollment process includes service preferences, requirements data, and/or other information.

At step 906, the employee 120 may also provide information concerning his or her bank account, such as a bank routing number, account number, etc. held by him or her. At step 908, the plan administrator server device 112 authenticates or verifies the employee 120 and his or her selected employer information. For example, and without limitation, the employee 120 may be asked to input a string of characters transmitted to the employee's work email account provided by the employer 104. The values entered by the employee 120 may be used by the plan administrator server device 112 to authenticate or verify the employee 120 prior to setting up the employee account and associating the employee 120 and the employee's bank account to the employee account. For example, the plan administrator server device 112 compares the entered values to the values associated with the employee verification email stored in a database (e.g., the database 114 shown in FIG. 1). If the entered values match the stored values, the employee 120 is authenticated or verified. If the employee information is not associated with the select employer, the employer verification fails. If either the employee or employer verification fails, the step 908 may be repeated and/or the method 900 ends.

Alternatively, the plan administrator server device 112 may authenticate the employee 120 via a one-time code sent to the employee 120 via, for example, Short Message Service (SMS), through a call center communication, and the like. Optionally, the method 900 may include an additional step for authenticating the employee 120 offline. For example, and without limitation, the plan administrator server device 112 may provide an offline PIN to the employee 120 via mail.

In some embodiment, at optional step 910, the plan administrator server device 112 requests that the employee 120 set up a step-up authentication method, i.e., two-factor authentication. The additional authentication measures may be taken before the account preferences may be entered into the incentivized savings plan by the employee 120. For example, and without limitation, in one embodiment, the employee 120 is requested to establish account access credentials, e.g., to select a username and password or PIN (personal identification number) to be used for security purposes, and/or for use by the employee 120 to login and change one or more account preferences and/or settings. In addition to the password or PIN, the user may be requested to set up a second authentication factor, including, for example, and without limitation, providing a biometric sample that is to be associated with the other registration information provided.

Biometric samples include, without limitation, a fingerprint image, a voice recording, a retinal image, facial recognition, palm print image, iris recognition, and the like. The biometric sample is unique to the employee 120 and difficult to duplicate and/or forge by an unauthorized user. The biometric sample may be stored and associated with a biometric identifier, for example, by the plan administrator server device 112 (e.g., in the database 114, etc.). Additionally, the biometric identifier may be associated with the stored registration information and facilitates secure authorization of requested data input by the employee 120. A biometric input device in communication with the user computing device 102 may be used for the employee 120 to enter the biometric sample. For example, the user computing device 102 may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code is sent to the user's mobile device via SMS), Time-Based One Time Password (TOTP) authentication (where an authenticator application provides a short code as a second factor), push-based two-factor authentication (where a prompt is sent to the user's mobile device), or any other two-factor authentication method that enables the method 900 to operate as described herein.

At step 912, the employee 120 is presented with the employee dashboard (shown in FIG. 6) and the plan administrator server device 112 requests that the employee 120 setup his or her account preferences data that may be used by the incentivized savings plan to withdraw employee payroll funds, setup employer matching funds, etc. The account preferences may then be saved, for example, as part of the account data of the employee account for the employee 120 in the database 114. The account preferences includes, for example, the employee contribution amount, which can be a fixed dollar amount, a percentage of each pay period, a percentage of the annual compensation, and/or any other amount allowed by the incentivized savings plan.

At step 914, the plan administrator server device 112 generates the employee account for the employee 120, associating the employee's account preferences, personal information, and bank account information with the employee account along with the employee's account access credentials, and stores the employee account in a database, e.g., the database 114.

Processing Contributions and Withdrawals

Figure 10:
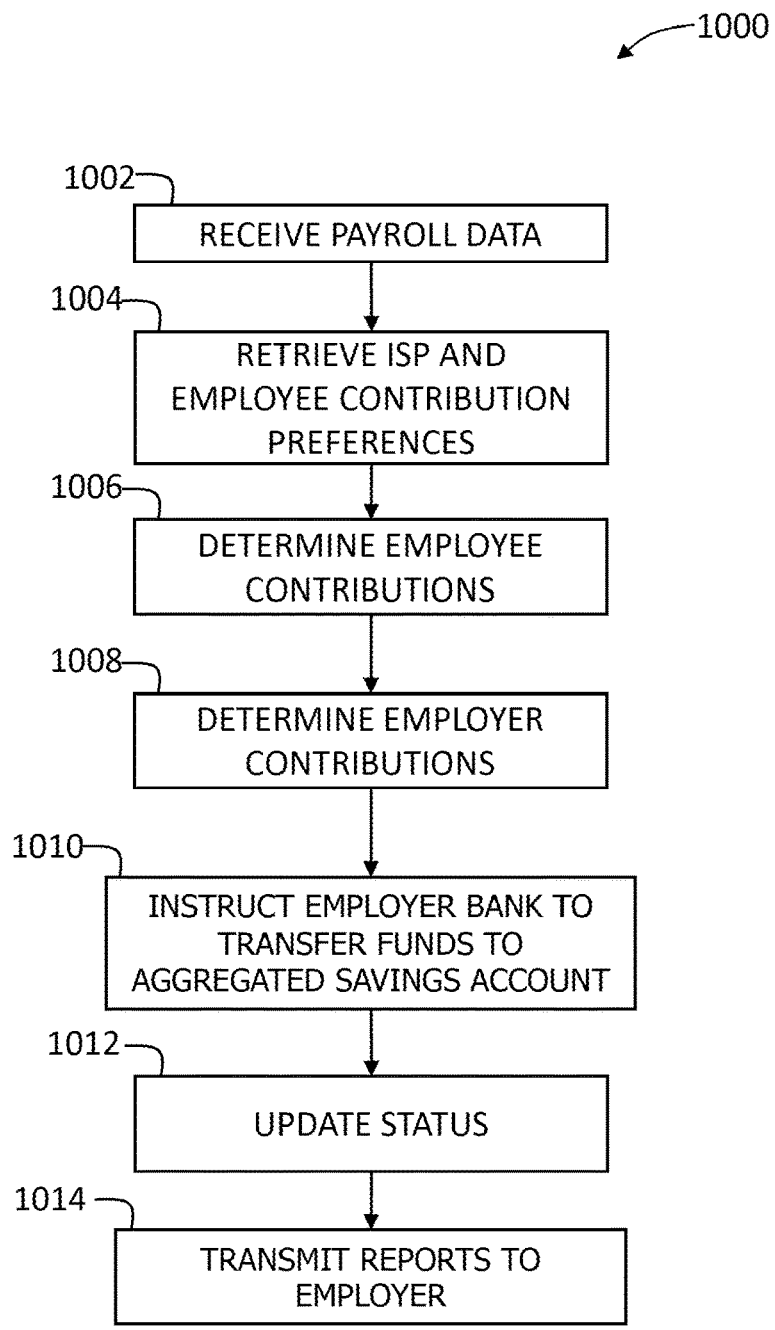
FIG. 10 is a flowchart illustrating an exemplary computer-implemented method for administering an incentivized savings plan, in accordance with one embodiment of the present disclosure.

FIG. 10 is a flowchart illustrating an exemplary computer-implemented method 1000 for administering an incentivized savings plan, in accordance with one embodiment of the present disclosure. The steps described herein may be performed in the order shown in FIG. 10 or may be performed in a different order. Furthermore, some steps may be performed concurrently as opposed to sequentially. In addition, some steps may be optional.

The computer-implemented method 1000 is described below, for ease of reference, as being executed by exemplary devices and components introduced with the embodiments illustrated in FIGS. 1-7. In one embodiment, the method 1000 may be implemented by the incentivized savings plan system 100 (shown in FIG. 1). In the exemplary embodiment, the method 1000 relates to administering an incentivized savings account of an employer, such as the employer 104 (shown in FIG. 1). An administrator operating the plan administrator platform 108 (shown in FIG. 1) is responsible for facilitating the contributions made by the employer 104 and employee 120, while also maintaining and updating records about each of the contributions, balance(s), and transactions associated with the incentivized savings plan, and more specifically, the aggregated savings account 124 (shown in FIG. 1). The plan administrator platform 108 may issue a report to the employer 104 each pay period, or any other defined period, informing the employer 104 about any match amount due for the incentivized savings plan. The report may also include information about the total balance in the aggregated savings account 124 as well as the individual balances for each employee 120. The plan administrator platform 108 may also track an amount of matching contributions issued per employee, who is eligible for a withdrawal, an amount of the eligible withdrawal, and an amount of matching contributions forfeited (e.g., because an employee 120 withdrew a contribution before it was eligible for a matching contribution). While steps within the method 1000 are described below regarding the plan administrator platform 108, and more particularly, the plan administrator server device 112, the method 1000 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

After the incentivized savings plan is established and one or more employees are enrolled (as described above with respect to FIGS. 8 and 9), the plan administrator server device 112 automatically administers the plan according to the employer and employee preferences/rules/selections. At step 1002, the plan administrator server device 112 receives payroll data from the employer 104, for example, via the employer computing device 104a. The payroll data includes, for example, the annual compensation amount for each employee and/or the employee compensation amount for the corresponding payroll period.

At step 1004, the plan administrator server device 112 retrieves the incentivized savings plan preferences data from the database 114, and for each participating employee 120, the employee's account preferences from the employees' respective employee accounts. At step 1006, the plan administrator server device 112 determines the employee contribution amount for each respective employee. For example, the plan administrator server device 112 retrieves the employee account preferences for each employee and the employee compensation amount for the corresponding payroll period. Based on the information, the plan administrator server device 112 calculates the employee contribution amount and stores it along with an associated contribution timestamp corresponding to the payroll date and/or time, for example, as an employee contribution transaction record in the incentivized savings plan (ISP) transaction table 128 (shown in FIG. 1). For example, in one embodiment, the plan administrator server device 112 multiplies the employee contribution percentage value by the employee compensation amount to determine the employee contribution amount. In another embodiment, where the employee's contribution amount is a fixed amount, the plan administrator server device 112 sets the employee contribution amount to the selected fixed amount.

At step 1008, the plan administrator server device 112 determines the employer matching contribution amount for each respective employee. For example, based on the incentivized savings plan preferences data, the plan administrator server device 112 calculates the employer matching contribution amount and stores it along with an employer contribution timestamp corresponding to the payroll date, for example, as an employer contribution transaction record in the ISP transaction table 128. For example, in one embodiment, the plan administrator server device 112 multiplies the employer selected rate cap value by the employee contribution amount to determine the employer matching contribution amount.

At step 1010, the plan administrator server device 112 transmits a funds transfer instruction to the employer bank 106 (specifically, a computing device of the employer bank 106) instructing the employer bank 106 to transfer an amount of funds from the employer's linked funding account to the aggregated savings account 124. At step 1012, upon successful transfer of funds from the employer's linked funding account, the plan administrator server device 112 updates the status of the incentivized savings plan data and stores it in the database 114. Based on the employer's selected preferences corresponding to the incentivized savings plan, at step 1014, the plan administrator server device 112 transmits one or more status reports to the employer 104, via the employer computing device 104a. The one or more status reports includes data corresponding to the employee contribution amount and/or the employer matching contribution amount.

An example is provided herein to illustrate some the processes and features described above. As described, after the employer 104 has created the incentivized savings plan, the employees 120 may choose to participate in the plan by making elective contributions into the aggregated savings account 124. The incentivized savings plan offered by the employer 104 may be integrated with the employer's payroll system. The integration into the payroll system may streamline the process for employees 120 to make contributions because the plan administrator platform 108 can automatically deduct money from the employee's paycheck and deposit the money directly into the employer's aggregated savings account 124. Once deposited into the account, the plan administrator platform 108 will credit the employee's savings balance (i.e., the portion of the aggregated savings account 124 attributable to the employee 120). The automatic contributions may be deducted from the employee's paycheck for any recurring time period, e.g. weekly, biweekly, monthly, quarterly, or yearly. The deduction may be a specified dollar amount, or it may be a percentage of pay for the time period. For example, the deduction may be a percentage of a bimonthly paycheck or a percentage of a yearly salary.

In this example, the employer 104 provides an incentive for employees 120 to save money by offering twenty-five cents ($0.25) on the dollar for every six (6) months the employee-contributed money is saved in the employer's aggregated savings account 124. The employer 104 will continue contributing $0.25 on the dollar until the money has been saved for twenty-four (24) months, at which point the employer 104 will have matched the employee's contribution dollar for dollar. For example, if the employee 120 contributes one thousand dollars ($1,000) to the aggregated savings account 124 and saves that money in the account for six (6) months, then the employer 104 will make a matching contribution of two hundred and fifty dollars ($250) into the aggregated savings account 124 and credit the contributing employee's balance. That is, the contribution timestamp of the $1,000 employee contribution is compared by the plan administrator server device 112 to a date of a subsequent pay period (a payroll date). If the contribution timestamp is greater than a six-month threshold date, the plan administrator server device 112 determines that an employer matching contribution is due. After another six (6) months has passed (twelve (12) months total), the employer 104 will contribute another two hundred and fifty dollars ($250) to the aggregated savings account 124 and credit the contributing employee's balance. Further, after another six (6) months has passed (eighteen (18) months total), the employer 104 will contribute another two hundred and fifty dollars ($250) to the aggregated savings account 124 and credit the contributing employee's balance. And finally, after an addition six (6) months has passed (twenty-four (24) months total), the employer 104 will contribute another two hundred and fifty dollars ($250) to the aggregated savings account 124 and credit the contributing employee's balance. Thus, at the end of twenty-four (24) months, the employer 104 will have deposited one thousand dollars ($1,000) for the employee 120 into the aggregated savings account 124, thereby matching the funds initially contributed by the employee 120. As described, at each subsequent payroll period, the contribution timestamps of previous employee contributions are compared to a current payroll date. Any employee contributions having contribution timestamps exceeding employer setup time thresholds are due employer matching contributions, as determined by the plan administrator server device 112.

Figure 11:
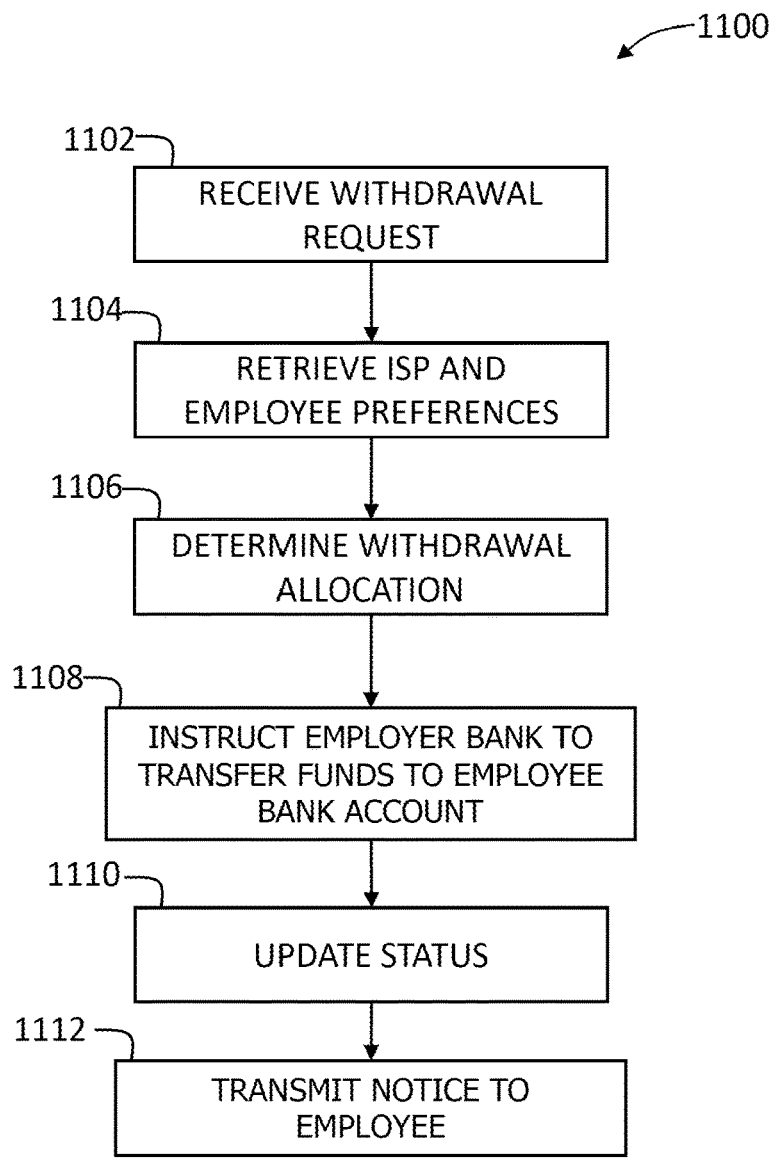
FIG. 11 is a flowchart illustrating an exemplary computer-implemented method for processing withdrawal requests for an incentivized savings plan, in accordance with one embodiment of the present disclosure.

As such, the incentivized saving plan transaction table may further include a plurality of employer contribution transaction records associated with the employer contributions (e.g., time-based matching contributions, traditional matching contributions, and the like), each of the employer contribution transaction records further associated with a respective additional employer contribution timestamp FIG. 11 is a flowchart illustrating an exemplary computer-implemented method 1100 for processing withdrawal requests for an incentivized savings plan, in accordance with one embodiment of the present disclosure. The steps described herein may be performed in the order shown in FIG. 11 or may be performed in a different order. Furthermore, some steps may be performed concurrently as opposed to sequentially. In addition, some steps may be optional.

The computer-implemented method 1100 is described below, for ease of reference, as being executed by exemplary devices and components introduced with the embodiments illustrated in FIGS. 1-7. In one embodiment, the method 1100 may be implemented by the incentivized savings plan system 100 (shown in FIG. 1). In the exemplary embodiment, the method 1100 relates to determining withdrawal allocations for an incentivized savings account of an employer, such as the employer 104 (shown in FIG. 1). While steps within the method 1100 are described below regarding the plan administrator platform 108, and more particularly, the plan administrator server device 112, the method 1100 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

An employee 120 may request withdrawal of at least a portion of funds associated with the employee's account associated with the incentivized savings plan (a withdrawal amount). At step 1102, the plan administrator server device 112 receives a withdrawal request (including a withdrawal amount) from an employee computing device, such as a computing device 102.

At step 1104, the plan administrator server device 112 retrieves the incentivized savings plan preferences data from the database 114, and for each participating employee 120, the employee's information/account preferences from the employees' respective employee accounts. At step 1106, the plan administrator server device 112 determines the withdrawal allocation between the employee contributions and the employer matching contributions. As described above, every contribution (whether employee or employer match) is timestamped with the date and/or time the contribution was made. The timestamp may be used to assess a duration of time the contributed money has been kept in the savings account, for possible time-based employer matching contributions. The timestamps for the employee contributions and the employer contributions are used for determining the allocation of the withdrawal. In an example, an employee 120 has employee contributions credited to his or her account for each of three (3) consecutive pay periods (e.g., Jan. 1, 2020, Jan. 15, 2020, and Jan. 29, 2020). In addition, the employee 120 has employer matching contributions credited to his or her account for each of the two (2) later pay periods (e.g., Jan. 15, 2020 and Jan. 29, 2020). As described herein, the incentivized savings plan may incorporate FIFO rules and additional rules indicating that employee contributions are withdrawn before employer contributions. In the example, a withdrawal request by the employee would result in the withdrawal of funds in the following order: employee contribution dated Jan. 1, 2020, employee contribution dated Jan. 15, 2020, employer matching contribution dated Jan. 15, 2020, employee contribution dated Jan. 29, 2020, and employer matching contribution dated Jan. 29, 2020.

At step 1108, the plan administrator server device 112 transmits a funds withdrawal instruction to the employer bank 106 (specifically, a computing device of the employer bank 106) instructing the employer bank 106 to transfer the withdrawal amount from the aggregated savings account 124 and deposit it into the employee's bank account. Alternatively, the employer bank 106 make issue a check to the employee in the amount of the requested withdrawal. At step 1110, upon successful transfer of funds to the employee 120, the plan administrator server device 112 updates the status of the incentivized savings plan data and stores it in the database 114. At step 1112, the plan administrator server device 112 transmits a transfer notice to the employee 120, via the user computing device 102.

An example is provided herein to illustrate some the processes and features described above with respect to FIG. 11. In this example, the employee 120 may withdraw money from the aggregated savings account 124 at any time, but only up to the amount reflected on his or her employee savings balance. Although the employee 120 may withdraw his or her deposited money at any time, an early withdrawal may affect whether the employee receives a matching contribution from the employer 104 at a later date. This is because withdrawals are processed on a FIFO basis according to the timestamps of the contributions. For example, assume an employee 120 contributes one thousand dollars ($1,000) timestamped in year one (1) and contributes another one thousand dollars ($1,000) timestamped in year two (2). The employee 120 withdraws one thousand five hundred dollars ($1,500) in year three (3). The withdrawal amount is first applied to the year one (1) contribution of one thousand dollars ($1,000). The remaining five hundred dollars ($500) of the withdrawal amount is then processed against the year two (2) contribution. Thus, the employee 120 no longer receives matching employer contributions for the money deposited in year one (1), and future matching contributions will be made according to the remaining five hundred dollars ($500) of savings timestamped in year two (2) and any subsequent employee contributions.

In another example embodiment, employer matching contributions may mitigate some of the employee withdrawals as described above. For example, assume the employee 120 has employee contributions of five hundred dollars ($500) each credited to his or her account for each of three (3) consecutive pay periods (e.g., Jan. 1, 2020, Jan. 15, 2020, and Jan. 29, 2020). In addition, the employee 120 has employer matching contributions of fifty dollars ($50) each credited to his or her account for each of the three (3) pay periods. Based on the FIFO rules described herein, a withdrawal request by the employee 120 of five hundred and fifty dollars ($550) would result in the withdrawal of five hundred dollars ($500) from the employee contribution dated Jan. 1, 2020 and the addition fifty dollars ($50) from the employer matching contribution dated Jan. 1, 2020. Thus, the entire amount of the employee contributions dated Jan. 15, 2020 and Jan. 29, 2020 would still be available for calculating subsequent employer matching contributions amounts. It is noted that the examples provided are merely illustrations and one of ordinary skill in the art will appreciate that this is for explanatory purposes and does not limit the scope of the present disclosure.

The incentivized savings plan described above provides benefits to employees, employers, banks, and communities. The employees benefit by receiving a simple and systematic savings vehicle for emergencies, as well as short-term and mid-term financial objectives. The incentivized savings plan encourages employees to save money by providing them with a significant return on investment through the employer's matching contributions. The incentivized savings plan also helps employees avoid borrowing money from payday loan establishments and predatory lending establishments.

These benefits result in increased financial stability for employees and their families.

Employers benefit from the incentivized savings plan because it provides a more financially stable workforce. Furthermore, the incentivized savings plan is a benefit that attracts employees to join the employer (aiding recruiting efforts) and stay with the employer (reducing costly employee turnover). The employer also benefits because the matching contributions may be tax-deductible at the same rate wages are tax-deductible. Finally, employers benefit because incentivized savings plans are not currently subject to ERISA or other qualified plan regulations.

Financial institutions and communities benefit from the incentivized savings plan because it helps people go from being unbanked or underbanked to being bankable. Communities further benefit as the work force becomes more financially stable, which may increase opportunities for people to purchase asset-building items such a home or higher education.

Exemplary Computer Systems

Figure 12:
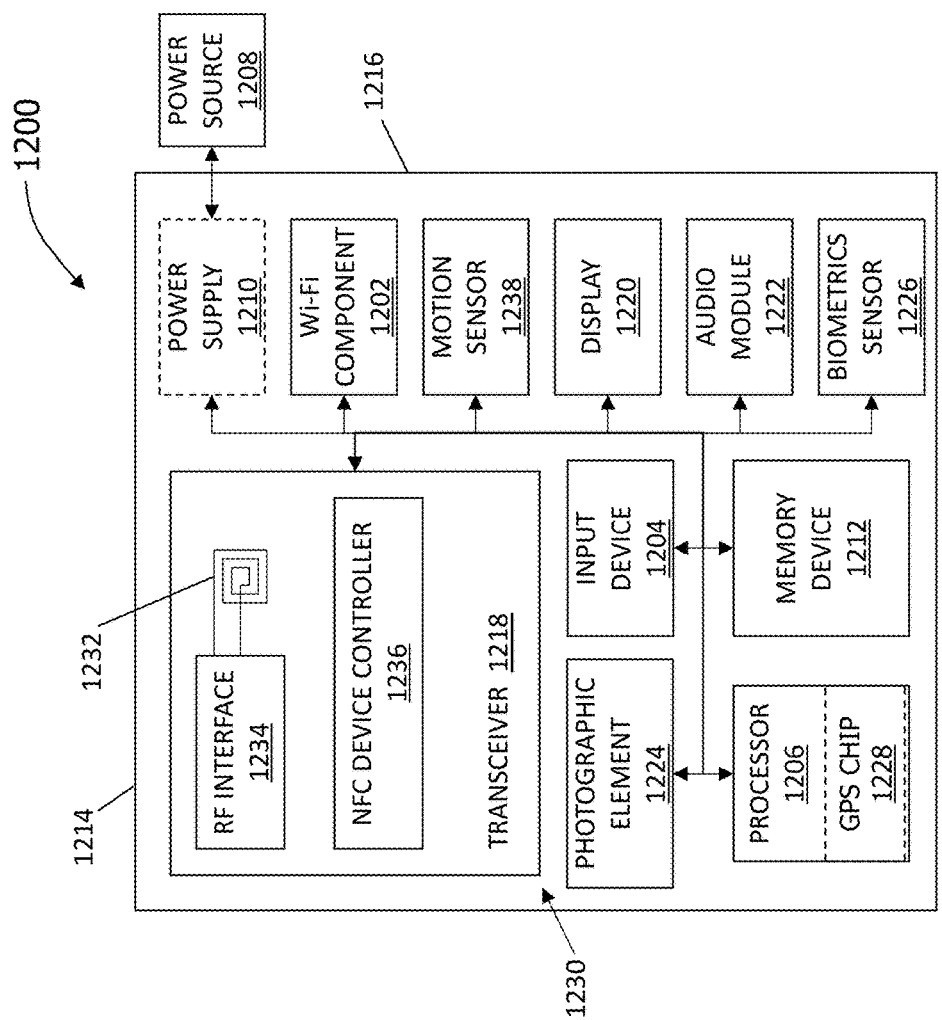
FIG. 12 is an example configuration of a user computing system (shown in FIG. 1) that may be operated by an employee.

FIG. 12 is an example configuration of a user computing system 1200, such as the use computing device 102 (shown in FIG. 1), that may be operated by a user, such as the employee 120 (shown in FIG. 1). In the exemplary embodiment, the computing system 1200 is a computing device configured to connect to one or more of the employer computing device 104a, the plan administrator server device 112, the employee bank 126, and any other computing devices, such as other user mobile computing devices (not shown).

In the exemplary embodiment, the computing system 1200 generally includes a processor 1206, a memory device 1212, a transceiver 1218 (or a wireless communication device), and a photographic element 1224. In addition, the computing system 1200 includes an integrated Wi-Fi component 1202 (e.g., implementing the Institute of Electrical and Electronics/IEEE 802.11 family of standards), an input device 1204, a display 1220, and an audio module 1222. Moreover, the computing system 1200 includes an internal power supply 1210 (e.g., a battery or other self-contained power source) to receive power, or alternatively, in some embodiments, the computing system 1200 may include an external power source 1208. Optionally, the computing system 1200 may include a motion sensor 1238.

The processor 1206 includes one or more processing units (e.g., in a multi-core configuration) specially programmed for executing computer readable instructions. The instructions may be executed within a variety of different operating systems (OS) on the user computing device 102, such as UNIX, LINUX, Microsoft Windows®, etc. More specifically, the instructions may cause various data manipulations on data stored in the memory device 1212 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 1212 is any device allowing information such as digital wallet data 1226, the executable instructions, and/or written works to be stored and retrieved. The memory device 1212 includes one or more computer readable media.

In the example embodiment, the processor 1206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for conducting cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 1200 may be widely deployed, it may be impractical to manually update software for each computing system 1200. Therefore, the incentivized savings plan system 100 provides a mechanism for automatically updating the software on the computing system 1200. For example, an updating mechanism may be used to automatically update any number of components and their drivers, both network and non-network components, including system level (OS) software components. In some embodiments, the computing system 1200 components are dynamically loadable and unloadable; thus, they may be replaced in operation without having to reboot the OS.

A location of the computing system 1200 can be obtained through conventional methods, such as a location service (e.g., global positioning system (GPS) service) in the computing system 1200, "ping" data that includes geotemporal data, from cell location register information held by a telecommunications provider to which the computing system 1200 is connected, and the like. For example, in one suitable embodiment, an optional GPS chip 1228 can be part of or separate from the processor 1206 to enable the location of the computing system 1200 to be determined.

Stored in the memory device 1212 are, for example, computer readable instructions for providing a user interface, such as the user interface 118 (shown in FIG. 1) to the user via the display 1220 and, optionally, receiving and processing input from the input device 1204. The user interface may include, among other possibilities, a web browser. Web browsers enable users, such as the employee 120, to display and interact with media and other information typically embedded on a web page or a website. The digital wallet allows the employee 120 to perform funds transfers and purchases transaction.

The photographic element 1224 may include a camera or other optical sensor and lens combination capable of generating a video signal and capturing an image. In various embodiments, the photographic element 1224 may be integrated in a housing or body, such as a housing 1214, of the computing system 1200. When the photographic element 1224 captures an image or otherwise generates image data (e.g., video data), the photographic element 1224 may store the image data in a data file, either in a raw or compressed format, in the memory device 1212.

In some embodiments, the motion sensor 1238 may include one or more sensor elements that facilitate detecting a person's presence. For example, if the computing system 1200 is operating as the user computing device 102, the motion sensor 1238 detects when the employee 120 moves or raises the user computing device 102. Upon detection of such motion, the photographic element 1224 may begin capturing images (e.g., still or video images), the transceiver 1218 may be activated, and/or the audio module 1222 may begin capturing audio. The motion sensor 1238 may be operatively coupled to the photographic element 1224 such that the person's presence may be detected by detecting motion using the photographic element 1224. The motion sensor 1238 may include, for example, and without limitation, sensor elements such as a passive infrared sensor, an ambient light sensor, and the like.

In the example embodiment, the display 1220 can include, for example, and without limitation, a liquid crystal display (LCD), an organic light emitting diode (OLED) display, or an "electronic ink" display. In some embodiments, a single component such as a touch screen may function as both an output device (e.g., the display 1220) and the input device 1204. As such, the display 1220 may optionally include a touch controller for support of touch capability. In such embodiments, the computing system 1200 may detect a person's presence by detecting that the person has touched the display 1220 of the computing system 1200.

The audio module 1222 may include, for example, and without limitation, a speaker and related components capable of broadcasting streaming and/or recorded audio and may also include a microphone. The microphone facilitates capturing audio through the computing system 1200.

In the example embodiment, the computing system 1200 includes the housing 1214 at least partly (and more preferably, at least substantially or entirely) enclosing the components described above. In addition, the computing system 1200 includes circuitry 1230 configured to communicate with the network 110 (shown in FIG. 1) and/or other computing devices. The circuitry 1230 may include, for example, leads, connectors, NFC-enabled circuitry, Wi-Fi-enabled circuitry, and photographic element circuitry. The housing 1214 is preferably configured to seal the circuitry 1230, which is susceptible to degradation from the ambient environment. In one embodiment, the circuitry 1230 is hermetically sealed in the housing 1214. For example, in one embodiment, the circuitry 1230 is completely and permanently encased within the housing 1214. In other words, the housing 1214 and the circuitry 1230 are intended to remain as a single, inseparable unit throughout the life of the user computing device 102. It is understood that the housing 1214 can be formed separately from the circuitry 1230 and that the circuitry 1230 can be placed into and sealed within the housing 1214 in a separate operation. It is also understood that the housing 1214 can be oversized with respect to the circuitry 1230 so that the circuitry 1230 can be placed loosely into the housing 1214. In another embodiment, the circuitry 1230 can be selectively, sealingly enclosed within the housing 1214, where the housing 1214 includes a closure 1216 removably attached to a body of the housing 1214.

The housing 1214 is fabricated from a suitably selected material that facilitates inhibiting the effect the material has on the signal being emitted from, for example, the transceiver 1218 and/or the Wi-Fi component 1202 and passing through the housing material. For example, and without limitation, suitable materials from which the housing 1214 may be fabricated include polyethylene, propylene, isoprene, and butylenes (i.e., polyolefins). In other embodiments, the housing 1214 is fabricated from any material that enables the computing system 1200 to function as described herein, such as metals, etc.

In one embodiment, the transceiver 1218 includes an antenna 1232. The antenna 1232 includes a looped wire configured to transmit radio signals when current flows through the looped wire. The antenna 1232 is any size, shape, and configuration that is suitable for transmitting signals as described herein. For example, the antenna 1232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 1232 generates a magnetic field when it vibrates at a selected frequency. Specifically, the antenna 1232 is configured to vibrate at a frequency of about 13.56 MHz, which is suitable for use in a near field communication (NFC) system.

In the example embodiment, the antenna 1232 transmits radio signals to and receives radio signals from other NFC-enabled computing devices, for example, another user computing device, merchant point-of-sale (POS) systems (not shown), and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 1232 functions as an NFC component to send and receive signals. The antenna 1232 is configured to transmit radio signals to NFC components positioned within the magnetic field of the antenna 1232, such as when the user computing device 102 is located within a predetermined distance of another user computing device 102 and/or a POS system. Therefore, the magnetic field generated by the antenna 1232 defines the active range of the computing system 1200. Additionally, the antenna 1232 receives radio signals from NFC components when the antenna 1232 is positioned within the magnetic field of the NFC components.

The transceiver 1218 also includes a radio frequency (RF) interface 1234 and an NFC device controller 1236. The RF interface 1234 and the NFC device controller 1236 are powered by the power source 1208, and in some embodiments, the internal power supply 1210 and/or the display 1220. In addition, the processor 1206 and the memory device 1212 are powered in the same manner. The RF interface 1234 is configured to receive and transmit RF signals through the antenna 1232. The NFC device controller 1236 is configured to process the received RF signals and to generate signals to be transmitted by the RF interface 1234. The memory device 1212 is configured to store data associated with transmitting and receiving the RF signals. The NFC device controller 1236 is coupled in communication with the processor 1206.

In some embodiments, the computing system 1200 may be connected to one or more peripheral devices (not shown). That is, the computing system 1200 may communicate various data with one or more peripheral devices. For example, the computing system 1200 may communicate with one or more peripheral devices through the Wi-Fi component 1202, the transceiver 1218, or other suitable means.

Figure 13:
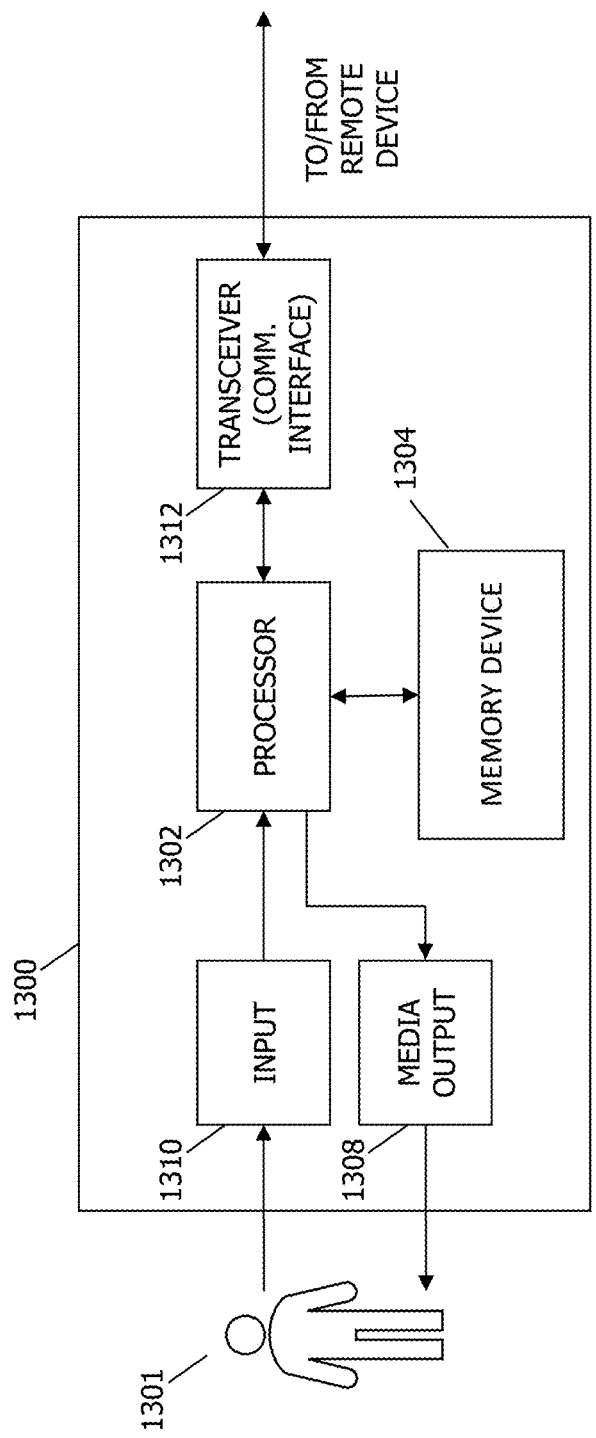
FIG. 13 is an example configuration of a computing device operated by a user.

FIG. 13 is an example configuration of a computing device 1300 operated by a user 1301. In some embodiments, the computing device 1300 is the employer computing device 104a (shown in FIG. 1), and/or computing devices of the employer bank 106 and/or the employee bank 126 (each shown in FIG. 1).

In the example embodiment, the computing device 1300 includes one or more processors 1302 for executing instructions. In some embodiments, executable instructions are stored in a memory device 1304. The processor 1302 may include one or more processing units arranged, for example, in a multi-core configuration. The memory device 1304 is any device allowing information such as executable instructions, data, and/or written works to be stored and retrieved. The memory device 1304 includes one or more computer readable media.

The computing device 1300 also includes at least one media output component 1308 for presenting information to the user 1301. The media output component 1308 is any component capable of conveying information to the user 1301. In some embodiments, the media output component 1308 includes an output adapter such as a video adapter and/or an audio adapter. An output adapter is operatively coupled to the processor 1302 and operatively connectable to an output device such as a display device, a liquid crystal display (LCD), organic light emitting diode (OLED) display, or "electronic ink" display, or an audio output device, a speaker, or headphones.

In some embodiments, the computing device 1300 includes an input device 1310 for receiving input from the user 1301. The input device 1310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 1308 and the input device 1310. The computing device 1300 may also include a transceiver 1312 (broadly, a communication interface), which is communicatively connectable to a remote device such as the user computing device 102 (shown in FIG. 1). The transceiver 1312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 1304 are, for example, computer readable instructions for providing a user interface to the user 1301 via the media output component 1308 and, optionally, receiving and processing input from the input device 1310. A user interface may include, among other possibilities, a web browser and various software applications. Web browsers enable users to display and interact with media and other information typically embedded on a web page or a website. The various software applications allow the user 1301 to interact with the computing device 1300 to further communicate with the user computing device 102, the plan administrator server device 112, etc. to facilitate providing various financial services to the employee 120 and manage the incentivized savings plan.

Figure 14:
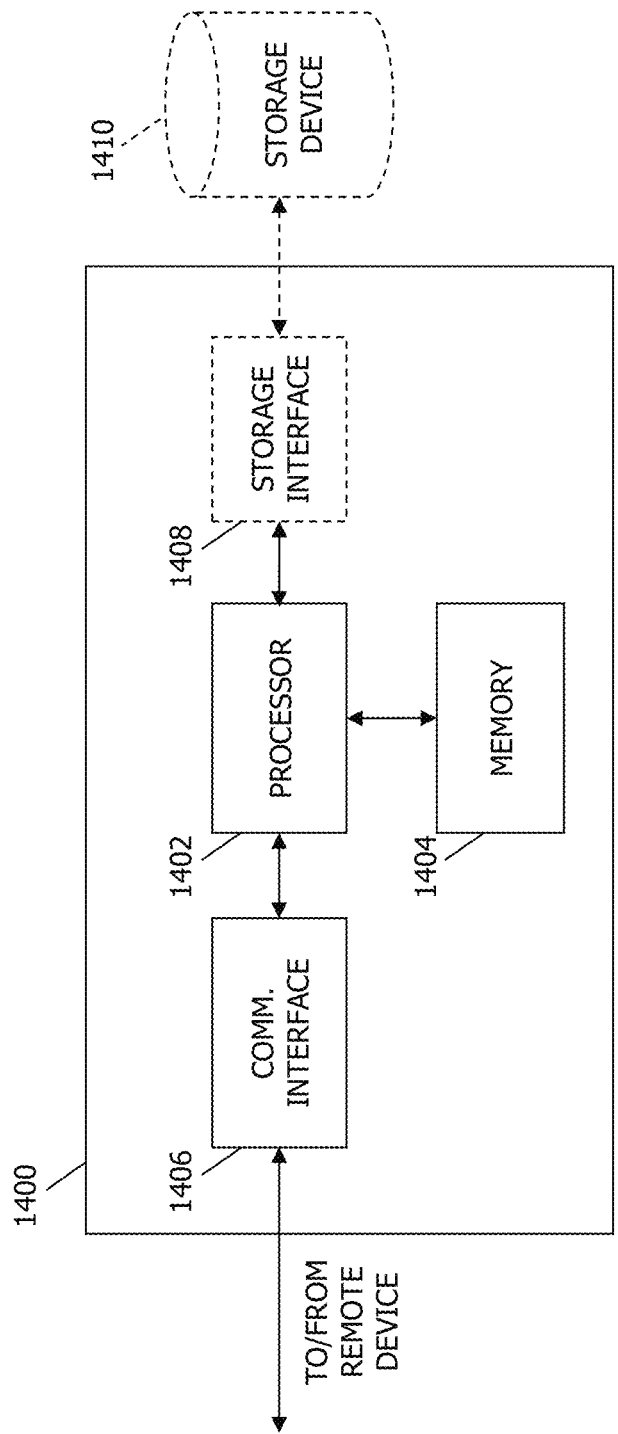
FIG. 14 is an example configuration of a server system, such as the plan administrator server device each shown in FIG. 1.

FIG. 14 is an example configuration of a server system 1400, such as the plan administrator server device 112 or the database server 122 (each shown in FIG. 1). In the example embodiment, the server system 1400 includes a processor 1402 for executing instructions. The instructions may be stored in a memory area 1404, for example. The processor 1402 includes one or more processing units (e.g., in a multi-core configuration) for executing the instructions. The instructions may be executed within a variety of different operating systems on the server system 1400, such as UNIX, LINUX, Microsoft Windows®, etc. More specifically, the instructions may cause various data manipulations on data stored in a storage device 1410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 1402 is operatively coupled to a communication interface 1406 such that the server system 1400 can communicate with a remote device such as user computing device 102, a computing device 1300, or another server system. For example, the communication interface 1406 may receive communications from the App 116.

The processor 1402 is operatively coupled to the storage device 1410. The storage device 1410 is any computer-operated hardware suitable for storing and/or retrieving data. In some embodiments, the storage device 1410 is integrated in the server system 1400. In other embodiments, the storage device 1410 is external to the server system 1400 and is like the database 114 (shown in FIG. 1). For example, the server system 1400 may include one or more hard disk drives as the storage device 1410. In other embodiments, the storage device 1410 is external to the server system 1400 and may be accessed by a plurality of server systems 400. For example, the storage device 1410 may include multiple storage units such as hard disks or solid-state disks in a redundant array of inexpensive disks (RAID) configuration. The storage device 1410 may include a storage area network (SAN) and/or a network attached storage (NAS) system.

In some embodiments, the processor 1402 is operatively coupled to the storage device 1410 via a storage interface 1408. The storage interface 1408 is any component capable of providing the processor 1402 with access to the storage device 1410. The storage interface 1408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1402 with access to the storage device 1410.

The memory area 1404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 1400 is implemented as a software application. In such embodiments, the hardware described above, such as the processor 1402, the memory area 1404, the communication interface 1406, and/or the storage interface 1408 may be shared with the hardware components of a computing device 1300, such as the processor 1302, the memory device 1304, and/or the transceiver 1312.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computing system comprising:
a database comprising an incentivized saving plan transaction table, the incentivized saving plan transaction table including a plurality of employee contribution transaction records associated with employee contributions, each of the respective employee contribution transaction records having a respective contribution timestamp, each respective contribution timestamp including a date and time of the respective employee contribution;
a communication interface; and
a processor coupled in communication to the database and the communication interface, said processor programmed to perform operations comprising:
presenting, on a display of an employer computing device via the communication interface, a signup screen, the signup screen including a first selectable icon;
receiving, from the employer computing device via the communication interface, an indication of a selection of the first selectable icon;
in response to the selection of the first selectable icon, presenting, on the display of an employer computing device, an account creation screen, the account creation screen including one or more input boxes for receiving employer registration information and a second selectable icon;
receiving, from the employer computing device via the communication interface, an indication of a selection of the second selectable icon;
in response to the selection of the second selectable icon, receiving, from the employer computing device via the communication interface, the employer registration information;
creating an employer account, the employer registration information being associated with the employer account;
receiving, from the employer computing device via the communication interface, incentivized savings plan preferences data, the employer account preferences data including employer selected timing criteria;
generating an incentivized savings plan based on the incentivized savings plan preferences data, the incentivized savings plan preferences data being associated with the employer account;
storing the employer account on the database;
receiving, from a user computing device via the communication interface, employee enrollment data for an employee account for a participating employee, the employee enrollment data including an employee work email account;
authenticating the participating employee comprising:
transmitting a verification email to the employee work email account, the verification email including a first string of characters;
receiving a second string of characters from the user computing device;
determining that the second string of characters match the first string of characters transmitted in the verification email; and
based on the determination of a match, authenticating the participating employee;
after authenticating the participating employee, creating the employee account based on the employee enrollment data;
presenting, on a display of the user computing device via the communication interface, an employee dashboard;
receiving, via input at the employee dashboard, employee account preferences, the employee account preferences including an employee selected contribution limit;
storing the employee account preferences as part of the employee account on the database;
receiving, from the employer computing device via the communication interface, payroll data, the payroll data including an employee compensation amount for a corresponding payroll period, the payroll data corresponding to a payroll date;
retrieving, from the database, the incentivized savings plan preferences data;
retrieving, from the database, the employee selected contribution limit;
based on the employee selected contribution limit and the employee compensation amount, determining an employee contribution amount;
associating an additional contribution timestamp with the employee contribution amount, the additional contribution timestamp including the payroll date;
storing the employee contribution amount and the associated additional contribution timestamp in the incentivized saving plan transaction table as an additional employee contribution transaction record;
based on the payroll date and each of the respective contribution timestamps, determining an employer matching contribution amount comprising:
comparing each of the respective contribution timestamps to the payroll date; and
determining that one or more of the respective contribution timestamps exceeds the employer selected timing criteria;
associating an employer contribution timestamp with the employer matching contribution amount, the employer contribution timestamp including the payroll date; and
storing the employer matching contribution amount and the associated employer contribution timestamp in the incentivized saving plan transaction table as an employer contribution transaction record.

2. The computing system in accordance with claim 1 further comprising said processor programmed to perform an operation comprising transmitting a funds transfer instruction to an employer bank computing device, the funds transfer instruction instructing the employer bank to transfer an amount of funds equal to the employee contribution amount and the employer matching contribution amount to an aggregated savings account.

3. The computing device in accordance with claim 1 further comprising said processor programmed to perform an operation comprising transmitting a status report to the employer computing device via the communication interface, the status report including data corresponding to the employee contribution amount and the employer matching contribution amount.

4. The computing device in accordance with claim 1 further comprising said processor programmed to perform operations comprising:
  receiving a withdrawal request from an employee computing device associated with an employee, the withdrawal request including a withdrawal amount; and
  determining a withdrawal allocation of the withdrawal amount between the employee contributions and one or more employer matching contributions,
  the incentivized saving plan transaction table further including a plurality of employer contribution transaction records associated with the employer matching contributions, each of the employer contribution transaction records further associated with a respective additional employer matching contribution timestamp.

5. The computing device in accordance with claim 4, wherein the operation of determining the withdrawal allocation comprises said processor programmed to perform operations comprising:
  comparing each of the respective contribution timestamps to the payroll date;
  comparing each respective additional employer matching contribution timestamp to the payroll date; and
  allocating the withdrawal amount between the employee contributions and employer matching contributions in a first in, first out manner based on the comparisons.

6. The computing device in accordance with claim 4, further comprising said processor programmed to perform an operation comprising transmitting a funds withdrawal instruction to an employer bank computing device, the funds withdrawal instruction instructing the employer bank to transfer an amount of funds equal to the withdrawal amount to a bank account of the employee.

\* \* \* \* \*